United States Patent
Goto

(10) Patent No.: US 11,427,895 B2
(45) Date of Patent: Aug. 30, 2022

(54) FENI ORDERED ALLOY, FENI ORDERED ALLOY MAGNET, AND METHOD FOR MANUFACTURING FENI ORDERED ALLOY

(71) Applicant: DENSO CORPORATION, Kariya (JP)

(72) Inventor: Sho Goto, Kariya (JP)

(73) Assignee: DENSO CORPORATION, Kariya (JP)

(*) Notice: Subject to any disclaimer, the term of this patent is extended or adjusted under 35 U.S.C. 154(b) by 69 days.

(21) Appl. No.: 16/574,514

(22) Filed: Sep. 18, 2019

(65) Prior Publication Data
US 2020/0010938 A1    Jan. 9, 2020

Related U.S. Application Data

(63) Continuation of application No. PCT/JP2018/015436, filed on Apr. 12, 2018.

(30) Foreign Application Priority Data

Apr. 13, 2017  (JP) .............................. JP2017-080025

(51) Int. Cl.
*C22C 38/08* (2006.01)
*C21D 3/08* (2006.01)
(Continued)

(52) U.S. Cl.
CPC ................ *C22C 38/08* (2013.01); *C21D 3/08* (2013.01); *C22C 1/0491* (2013.01); *H01F 1/068* (2013.01)

(58) Field of Classification Search
CPC ..... C22C 38/08; C22C 1/0491; C22C 38/105; C22C 1/0433; C22C 33/0285;
(Continued)

(56) References Cited

U.S. PATENT DOCUMENTS

2004/0033357 A1  2/2004  Hattori et al.
2004/0261905 A1  12/2004  Hattori et al.
(Continued)

FOREIGN PATENT DOCUMENTS

JP    2014-105376 A    6/2014
JP    2014-231624 A    12/2014
(Continued)

OTHER PUBLICATIONS

M Kotsugi et al, Structural, magnetic and electronic state characterization of L10-type ordered FeNi alloy extracted from a natural meteorite, 2014 J. Phys.: Condens. Matter 26 064206, doi:10.1088/0953-8984/26/6/064206 (Year: 2014).*

(Continued)

*Primary Examiner* — John A Hevey
(74) *Attorney, Agent, or Firm* — Posz Law Group, PLC

(57) ABSTRACT

An FeNi ordered alloy has an $L1_0$ ordered structure, a mean order degree of 0.4 or more throughout a material, and a coercivity of 87.5 kA/m or more. For example, a nitriding treatment of an FeNi random alloy is performed and then a nitriding treatment is performed to obtain an $L1_0$-FeNi ordered alloy. A volume mean particle size of a FeNi random alloy is, for example, 45 nm or more, and a treatment temperature of the nitriding treatment is, for example, greater than or equal to 300 degrees Celsius and is less than or equal to 500 degrees Celsius, and a treatment period is, for example, 10 hours or longer.

7 Claims, 15 Drawing Sheets

FeNi RANDOM ALLOY

FeNiN

FeNi SUPERLATTICE

(51) Int. Cl.
*C22C 1/04* (2006.01)
*H01F 1/06* (2006.01)

(58) Field of Classification Search
CPC .......... C22C 19/03; C22C 38/00; C21D 3/08; H01F 1/068; B22F 1/0018; B22F 1/0085; B22F 2999/00; B22F 1/0088; B82Y 30/00; B82Y 40/00
See application file for complete search history.

(56) References Cited

U.S. PATENT DOCUMENTS

2004/0261906 A1  12/2004  Hattori et al.
2004/0261907 A1  12/2004  Hattori et al.
2017/0250024 A1  8/2017   Lewis et al.
2018/0044768 A1  2/2018   Makino
2018/0251867 A1  9/2018   Kura et al.

FOREIGN PATENT DOCUMENTS

| JP | 2016-079484 A | 5/2016 | |
| WO | 2012/141205 A2 | 10/2012 | |
| WO | WO-2016036856 A1 * | 3/2016 | ............... H01F 7/02 |

OTHER PUBLICATIONS

Kojima et al., "Fe—Ni composition dependence of magnetic anisotropy in artificially fabricated L10-ordered FeNi films," Journal of Physics: Condensed Matter, Jan. 27, 2014, vol. 26, No. 6, pp. 1-10.

* cited by examiner

FIG. 4

| | RANDOM ALLOY PRODUCE METHOD | COMPN RATIO (Fe:Ni) | VOL MEAN PARTICLE SIZE [nm] | NITRIDING COND (TEMP [°C] / TIME [h]) | DENITRIDING COND (TEMP [°C] / TIME [h]) | L1₀ FORMING | ORDER DEG | COERCIVITY ([kA/m]/[Oe]) |
|---|---|---|---|---|---|---|---|---|
| COMP EX S0 | THERMAL PLASMA | 50:50 | 104 | —/— | —/— | NO | 0.00 | 10.2/128 |
| COMP EX S1 | THERMAL PLASMA | 50:50 | 104 | 300/4 | —/— | NO | 0.00 | 4.0/50 |
| COMP EX S2 | THERMAL PLASMA | 50:50 | 104 | —/— | 300/4 | NO | 0.00 | 15.9/200 |
| COMP EX S3 | THERMAL PLASMA | 50:50 | 104 | 300/4 | 300/4 | YES | 0.52 | 33.3/418 |
| COMP EX S4 | FLAME SPRAYING | 55:45 | 50 | 300/4 | 300/4 | YES | 0.41 | 29.9/376 |
| COMP EX S5 | COPRECIPITATION | 47:53 | 200 | 300/4 | 300/4 | YES | 0.37 | 27.6/347 |
| COMP EX S6 | THERMAL PLASMA | 50:50 | 104 | 325/4 | 300/4 | YES | 0.52 | 30.2/380 |
| COMP EX S7 | THERMAL PLASMA | 50:50 | 104 | 350/4 | 300/4 | YES | 0.51 | 30.6/384 |
| COMP EX S8 | THERMAL PLASMA | 50:50 | 104 | 400/4 | 300/4 | YES | 0.52 | 29.5/371 |
| COMP EX S9 | THERMAL PLASMA | 50:50 | 104 | 500/4 | 300/4 | YES | 0.42 | 27.9/351 |
| COMP EX S10 | THERMAL PLASMA | 50:50 | 104 | 325/4 | 150/4 | NO | 0.00 | 10.5/132 |
| COMP EX S11 | THERMAL PLASMA | 50:50 | 104 | 325/4 | 200/4 | YES | 0.23 | 29.8/374 |
| COMP EX S12 | THERMAL PLASMA | 50:50 | 104 | 325/4 | 250/4 | YES | 0.51 | 30.4/382 |
| COMP EX S13 | THERMAL PLASMA | 50:50 | 104 | 325/4 | 350/4 | YES | 0.54 | 32.6/410 |
| COMP EX S14 | THERMAL PLASMA | 50:50 | 104 | 325/4 | 400/4 | YES | 0.53 | 34.1/429 |
| COMP EX S15 | THERMAL PLASMA | 50:50 | 104 | 325/4 | 450/4 | NO | 0.00 | 11.0/138 |
| COMP EX S16 | THERMAL PLASMA | 50:50 | 104 | 325/4 | 500/4 | NO | 0.00 | 10.8/136 |
| COMP EX S17 | THERMAL PLASMA | 50:50 | 30 | 300/50 | 300/1 | YES | 0.71 | 58.1/730 |
| WORK EX S18 | THERMAL PLASMA | 50:50 | 45 | 300/50 | 300/1 | YES | 0.55 | 88.1/1107 |
| WORK EX S19 | THERMAL PLASMA | 50:50 | 60 | 300/50 | 300/1 | YES | 0.67 | 89.7/1127 |
| WORK EX S20 | THERMAL PLASMA | 50:50 | 80 | 300/50 | 300/1 | YES | 0.40 | 99.6/1252 |
| WORK EX S21 | THERMAL PLASMA | 50:50 | 120 | 300/50 | 300/1 | YES | 0.54 | 137.5/1728 |
| WORK EX S22 | THERMAL PLASMA | 50:50 | 140 | 300/50 | 300/1 | YES | 0.64 | 150.6/1892 |
| WORK EX S23 | THERMAL PLASMA | 50:50 | 130 | 300/50 | 300/1 | YES | 0.76 | 149.1/1874 |
| WORK EX S24 | THERMAL PLASMA | 50:50 | 100 | 300/50 | 300/1 | YES | 0.71 | 125.5/1577 |

FENI ORDERED ALLOY, FENI ORDERED ALLOY MAGNET, AND METHOD FOR MANUFACTURING FENI ORDERED ALLOY

CROSS-REFERENCE TO RELATED APPLICATIONS

The present application is a continuation application of International Patent Application No. PCT/JP2018/015436 filed on Apr. 12, 2018, which designated the U.S. and claims the benefit of priority from Japanese Patent Application No. 2017-80025 filed on Apr. 13, 2017. The entire disclosures of all of the above applications are incorporated herein by reference.

TECHNICAL FIELD

The present disclosure relates to an $L1_0$-FeNi ordered alloy having an $L1_0$ ordered structure and an FeNi ordered alloy magnet produced using such an $L1_0$-FeNi ordered alloy.

BACKGROUND

An FeNi (iron-nickel) ordered alloy of $L1_0$ type is expected to be a promising magnet material and a promising magnetic recording material for which no rare earth element and no noble metal are used at all.

SUMMARY

The present disclosure provides an FeNi ordered alloy that is usable also as a magnet material or a magnetic recording material and to provide a method for manufacturing an FeNi ordered alloy.

In a first aspect of the present disclosure, there is provided an FeNi ordered alloy that has an $L1_0$ ordered structure, a mean order degree of 0.4 or more throughout a material, and coercivity of 87.5 kA/m or more.

In a second aspect of the present disclosure, there is provided a method for manufacturing an FeNi ordered alloy having an $L1_0$ ordered structure, the method comprising: performing nitriding treatment of nitriding an FeNi random alloy (100); and performing denitriding treatment of removing nitrogen from the nitrided FeNi random alloy to obtain an $L1_0$-FeNi ordered alloy having a mean order degree of 0.4 or more throughout a material and a coercivity of 87.5 kA/m or more, wherein, in the nitriding treatment, a treatment temperature of the nitriding treatment is greater than or equal to 300 degrees Celsius and is less than or equal to 500 degrees Celsius, and a treatment period is 10 hours or longer.

In a third aspect of the present disclosure, there is provided a method for manufacturing an FeNi ordered alloy having an $L1_0$ ordered structure, the method comprising: synthesizing a compound in which Fe and Ni are arranged in the same lattice structure as $L1_0$-FeNi ordered structure; and generating an $L1_0$-FeNi ordered alloy by removing an unnecessary element other than Fe and Ni from the compound, wherein synthesizing the compound includes: synthesizing FeNiN as an intermediate product of the compound by nitriding an FeNi random alloy at a treatment temperature greater than or equal to 200 degrees Celsius and less than or equal to 500 degrees Celsius for a treatment period of 10 hours or longer.

BRIEF DESCRIPTION OF DRAWINGS

FIG. 4 is a diagram illustrating manufacturing conditions and evaluation results of Working Examples and comparative examples according to a first embodiment.

DETAILED DESCRIPTION

Figure 1:
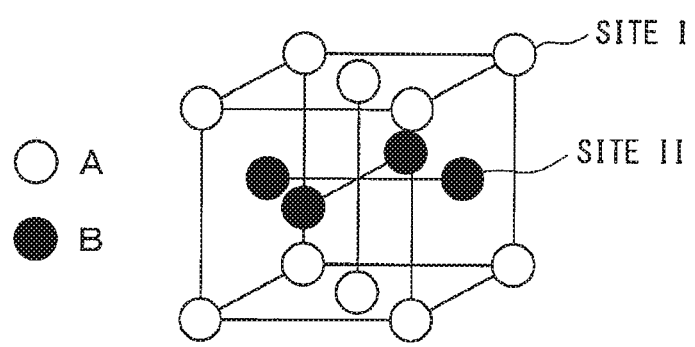
FIG. 1 is a schematic diagram illustrating a lattice structure of $L1_0$-FeNi ordered structure.

An FeNi (iron-nickel) ordered alloy of $L1_0$ type is expected to be a promising magnet material and a promising magnetic recording material for which no rare earth element and no noble metal are used at all. Here, the $L1_0$ ordered structure is a crystal structure which has a face-centered cubic lattice as the basic structure and in which Fe and Ni are layered in the (001) direction. Such an $L1_0$ ordered structure is found in alloys such as FePt, FePd and AuCu and can be typically obtained by thermally treating a random alloy at the order-disorder transition temperature TA or lower and promoting the diffusion.

However, the transition temperature TA for obtaining an $L1_0$-FeNi ordered alloy is a low temperature of 320 degrees Celsius, and synthesis by thermal treatment only is difficult because the diffusion is extremely slow at this temperature or lower. Therefore, various attempts have been made to synthesize an $L1_0$-FeNi ordered alloy.

Specifically, there have been proposed a method of alternately layering single atom films of Fe and Ni using molecular beam epitaxy (abbreviation: MBE) as described in Non-Patent Literature 1, a method of performing thermal treatment in a magnetic field with the application of neutrons, and the like.

Non-Patent Literature 1: Kojima et al., "Fe—Ni composition dependence of magnetic anisotropy in artificially fabricated L10-ordered FeNi films", J. Phys.: Condens. Matter, vol. 26, (2014), 064207

However, an order degree of an $L1_0$-FeNi ordered alloy obtained by known methods such as the method using molecular beam epitaxy described in Non-Patent Literature 1 or the method using the application of neutrons is generally small and is about 0.4 at the largest. Moreover, the largest order degree is not obtained throughout a material of the FeNi ordered alloy, but only some parts have a large order degree. Furthermore, the coercivity of the obtained FeNi ordered alloy is not large enough for using the FeNi ordered alloy as a magnet material or a magnetic recording material. For example, a magnetic recording material is required to have such a large coercivity that the stored data are not overwritten by the environmental magnetic field.

An object of the present disclosure is to provide an FeNi ordered alloy that is usable also as a magnet material or a magnetic recording material and to provide an FeNi ordered alloy magnet constituted using the alloy.

In a first aspect of the present disclosure, an FeNi ordered alloy has an $L1_0$ ordered structure, a mean order degree of 0.4 or more throughout a material, and coercivity of 87.5 kA/m or more.

When the FeNi ordered alloy has the order degree of 0.4 or more and a coercivity of 87.5 kA/m or more, the FeNi ordered alloy can be used also as a magnet material or a magnetic recording material. For example, an FeNi ordered alloy magnet can be obtained using the FeNi ordered alloy.

In a second aspect of the present disclosure, a method for manufacturing an FeNi ordered alloy having an $L1_0$ ordered structure comprises: performing nitriding treatment of nitriding an FeNi random alloy (100); and performing denitriding treatment of removing nitrogen from the nitrided FeNi random alloy to obtain an $L1_0$-FeNi ordered alloy having a mean order degree of 0.4 or more throughout a material and a coercivity of 87.5 kA/m or more, wherein, in the nitriding treatment, a treatment temperature of the nitriding treatment is greater than or equal to 300 degrees Celsius and is less than or equal to 500 degrees Celsius, and a treatment period is 10 hours or longer.

By this method for manufacturing an FeNi ordered alloy, it is possible to easily synthesize an $L1_0$-FeNi ordered alloy having a mean order degree of 0.4 or more throughout a material and a coercivity of 87.5 kA/m or more.

In a third aspect of the present disclosure, a method for manufacturing an FeNi ordered alloy having an $L1_0$ ordered structure comprises: synthesizing a compound in which Fe and Ni are arranged in the same lattice structure as $L1_0$-FeNi ordered structure; and generating an $L1_0$-FeNi ordered alloy by removing an unnecessary element other than Fe and Ni from the compound, wherein synthesizing the compound includes: synthesizing FeNiN as an intermediate product of the compound by nitriding an FeNi random alloy at a treatment temperature greater than or equal to 200 degrees Celsius and less than or equal to 500 degrees Celsius for a treatment period of 10 hours or longer.

In this manner, a compound in which Fe and Ni are arranged in the same lattice structure as $L1_0$-FeNi ordered structure is synthesized, and an $L1_0$-FeNi ordered alloy is generated from the compound. By such a manufacturing method, an $L1_0$-FeNi ordered alloy having a mean order degree of 0.4 or more throughout a material and a coercivity of 87.5 kA/m or more can be easily synthesized.

Now, embodiments of the present disclosure will be described below based on the drawings. In description of the embodiments, the same references are used to refer to the same or equivalent parts.

First Embodiment

The first embodiment will be described. An $L1_0$-FeNi ordered alloy according to the present embodiment, namely FeNi superlattice, is applied to a magnetic material such as a magnet material and a magnetic recording material and has an order degree S of 0.4 or more, a large coercivity He of 87.5 kA/m or more and excellent magnetic properties.

Herein, the order degree S indicates the degree of ordering in FeNi superlattice. As mentioned above, an $L1_0$ ordered structure has a face-centered cubic lattice as a basic structure and has a lattice structure shown in FIG. 1. In this diagram, the top face layer in the laminate structure on the (001) plane of the face-centered cubic lattice is called the site I, and the intermediate layer positioned between the top face layer and the bottom face layer is called the site II. In this case, the ratio of metal A and metal B existing at the site I is represented by $A_xB_{1-x}$, where x is the proportion of metal A existing at the site I, and 1-x is the proportion of metal B existing at the site. Similarly, the ratio of metal A and metal B existing at the site II is represented by $A_{1-x}B_x$, where x is the proportion of metal B existing at the site II, and 1-x is the proportion of metal A existing at the site. Here, x satisfies $0.5 \leq x \leq 1$. Moreover, in this case, the order degree S is defined as $S=2x-1$.

Figure 2:
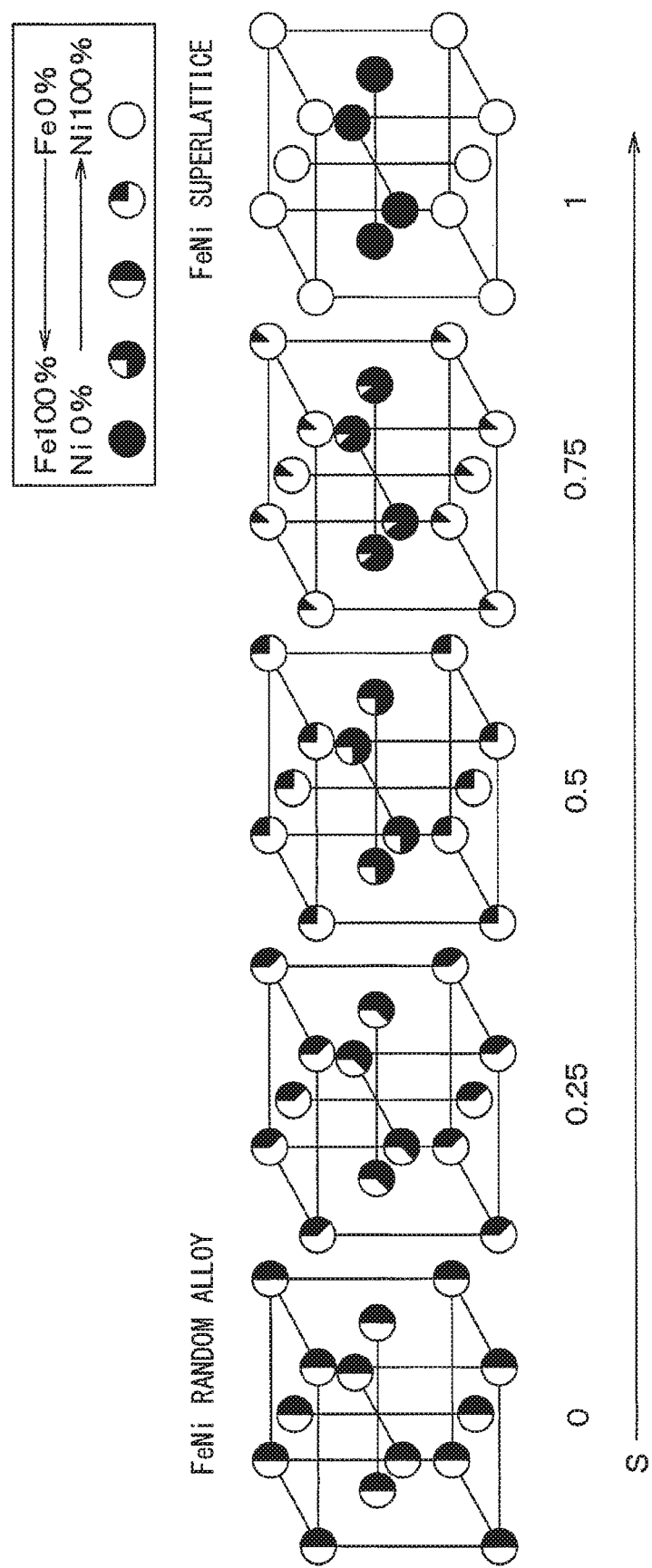
FIG. 2 is a schematic diagram illustrating lattice structures of FeNi alloys having different order degrees S, between an FeNi random alloy having an order degree S of zero and an FeNi superlattice having an order degree S of one.

Accordingly, when metal A and metal B, respectively, are Ni and Fe and when Ni and Fe, respectively, are in white and black for example, the order degree S of an FeNi alloy is expressed as shown in FIG. 2 in the which the order degree S is shown between the FeNi random alloy having the order degree S of zero and the FeNi superlattice having the order degree S of one. In this regard, a completely white circle indicates that the proportion of Ni is 100% and that the proportion of Fe is 0%, and a completely black circle indicates that the proportion of Ni is 0% and that the proportion of Fe is 100%. Moreover, a circle which is half while and half black indicates that the proportion of Ni is 50% and that the proportion of Fe is 50%.

Regarding the order degree S represented in this manner, when the ratio of Ni serving as metal A is higher at the site I and when the ratio of Fe as metal B is higher at the site II for example, which results in a mean order degree S of a material as a whole of 0.4 or more as in the present embodiment, excellent magnetic properties can be obtained. In this regard, however, it is required that the order degree S should be evenly large throughout the material, and excellent magnetic properties cannot be obtained when the value is large locally. For example, the order degree S should be a predetermined value or larger in all of the face-centered cubic lattices of the $L1_0$ ordered structure, and the magnetic properties do not become excellent when the order degrees S of some lattices are large locally and this locally large order degrees causes the apparent order degree S to be the same Herein, a case in which the value is large locally is not included in the case in which the mean order degree S is 0.4 or more throughout the material.

Figure 3:
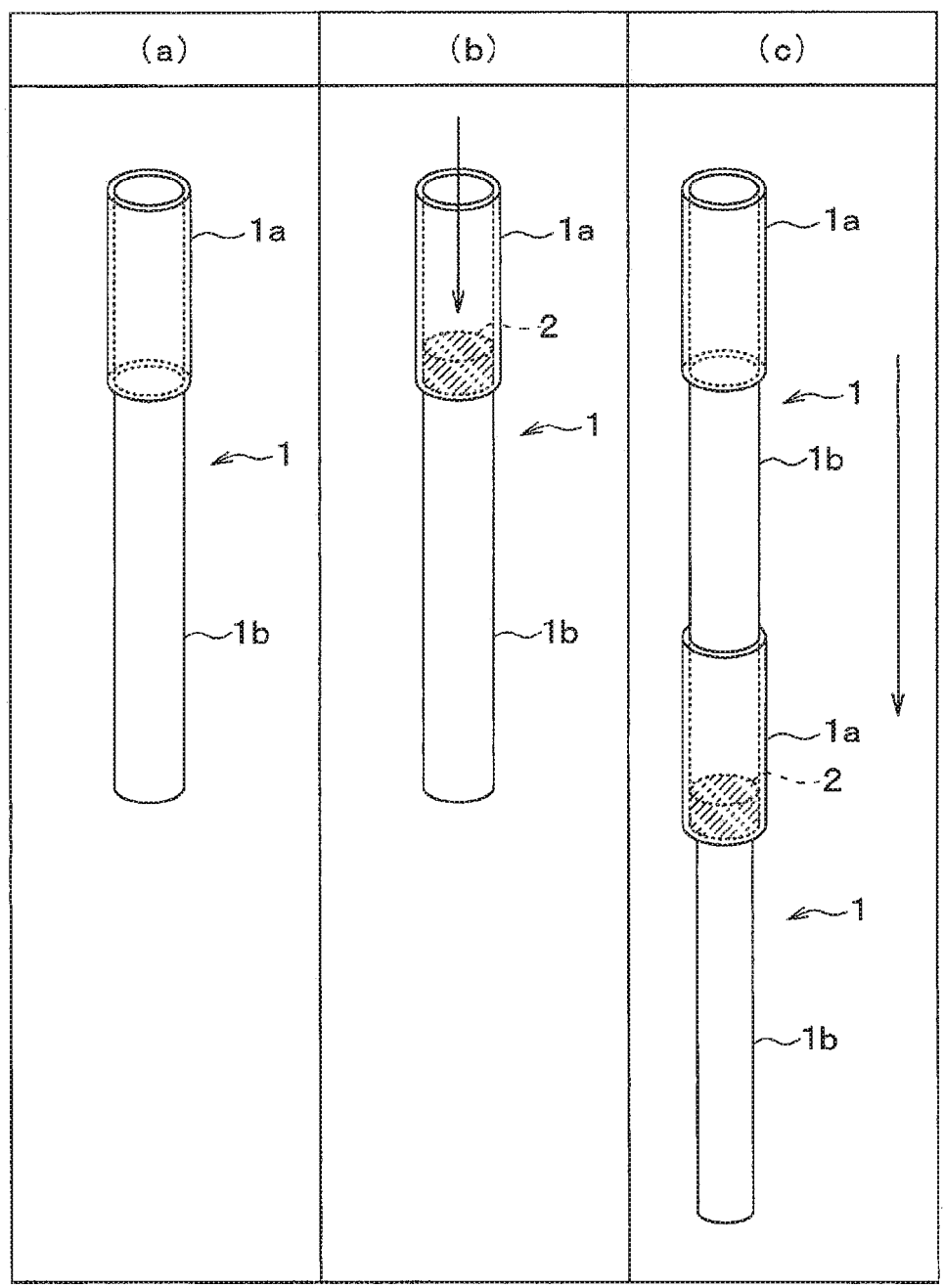
FIG. 3 is perspective views illustrating processes in preparing a sample for measuring coercivity Hc.

The coercivity He is determined as the intensity of the magnetic field at the point when the direction of magnetization of the obtained FeNi ordered alloy switches due to the influence of a magnetic field when the magnetic field is applied to the FeNi ordered alloy. Specifically, as shown in (a) in FIG. 3, a sample holder 1 having a bottomed cylindrical container 1a having an inner diameter of 2 mm and a height of 7 mm and a columnar bar part 1b having an outer diameter of 2 mm and a height of 15 mm is prepared. Then, the container 1a is filled with 10 mg of particles of an FeNi ordered alloy as shown in (b) in FIG. 3, and the FeNi ordered alloy is pressed from the opening of the container 1a with the bar part 1b of another sample holder 1 as shown in (c) in FIG. 3. In this manner, a sample 2 which is fixed in a columnar shape is formed in the container 1a. A sufficiently strong magnetic field is applied to the sample 2 of the FeNi ordered alloy to achieve a saturated state in which the magnetization of the sample 2 does not become larger any more. Then, a magnetic field in the opposite direction is applied, and the moment at which the magnetization of the sample 2 becomes zero is detected. The intensity of the magnetic field at this point is defined as the coercivity Hc. For example, the intensity of the magnetic field is determined as a magnetic field sweeping rate 10 (Oe) using a small refrigerant-free PPMS VersaLab manufactured by Quantum Design, Inc.

Here, the unit of coercivity He is kA/m in the SI system and Oe (oersted) in the CGS system. Because 1 A/m=$4\pi X10^{-3}$ (Oe), 87.5 kA/m=1100 (Oe).

In order that an FeNi ordered alloy can be used also as a magnet material or a magnetic recording material, the FeNi ordered alloy is required to have a coercivity He which is required for such a material. As a result of extensive investigation on the coercivity Hc, the present inventor has found that the coercivity He of 87.5 kA/m or more is required in order to use an FeNi ordered alloy also as a magnet material or a magnetic recording material. It has been also found that there is a correlation between the order degree S and the coercivity He and that the mean order degree S of the FeNi ordered alloy should be 0.4 or more throughout of the FeNi ordered alloy in order that the coercivity He of the FeNi ordered alloy becomes 87.5 kA/m or more.

Accordingly, in the present embodiment, an FeNi ordered alloy having the order degree S of 0.4 or more and the coercivity He of 87.5 kA/m or more is used. It has been also found that the coercivity He of an FeNi ordered alloy also depends on the particle size and the manufacturing method of the FeNi ordered alloy. In order to obtain a larger coercivity Hc, it is desired to use an FeNi ordered alloy having a suitable particle size or to use a suitable manufacturing method as described below.

Such an $L1_0$-FeNi ordered alloy is obtained, for example, by performing nitriding treatment of nitriding an FeNi random alloy and then performing denitriding treatment of removing nitrogen from the nitrided FeNi random alloy. Here, a random alloy is an alloy in which the arrangement of the atoms is irregular and at random.

The method for manufacturing an $L1_0$-FeNi ordered alloy according to the present embodiment is specifically explained referring to comparative examples S0 to S17 and working examples S18 to S24 shown in FIG. 4.

In these working examples and comparative examples, powder samples of FeNi random alloys manufactured by a thermal plasma process, a flame spraying process or a coprecipitation process were treated under the conditions for nitriding treatment and the conditions for denitriding treatment shown in FIG. 4. Then, the X-ray diffractions of the alloys after the treatments were measured, and whether an $L1_0$ ordered structure has been formed was evaluated.

Here, the composition ratios of the powder samples of the FeNi random alloys of the working examples and the comparative examples shown in FIG. 4 are the atomic weight ratios of Fe:Ni, and the particle sizes are volume mean particle sizes (unit: nm). Moreover, regarding the conditions for the nitriding treatment and the conditions for the denitriding treatment, the treatment temperatures (unit: ° C.) and the treatment periods (unit: h) are shown.

Figure 5:
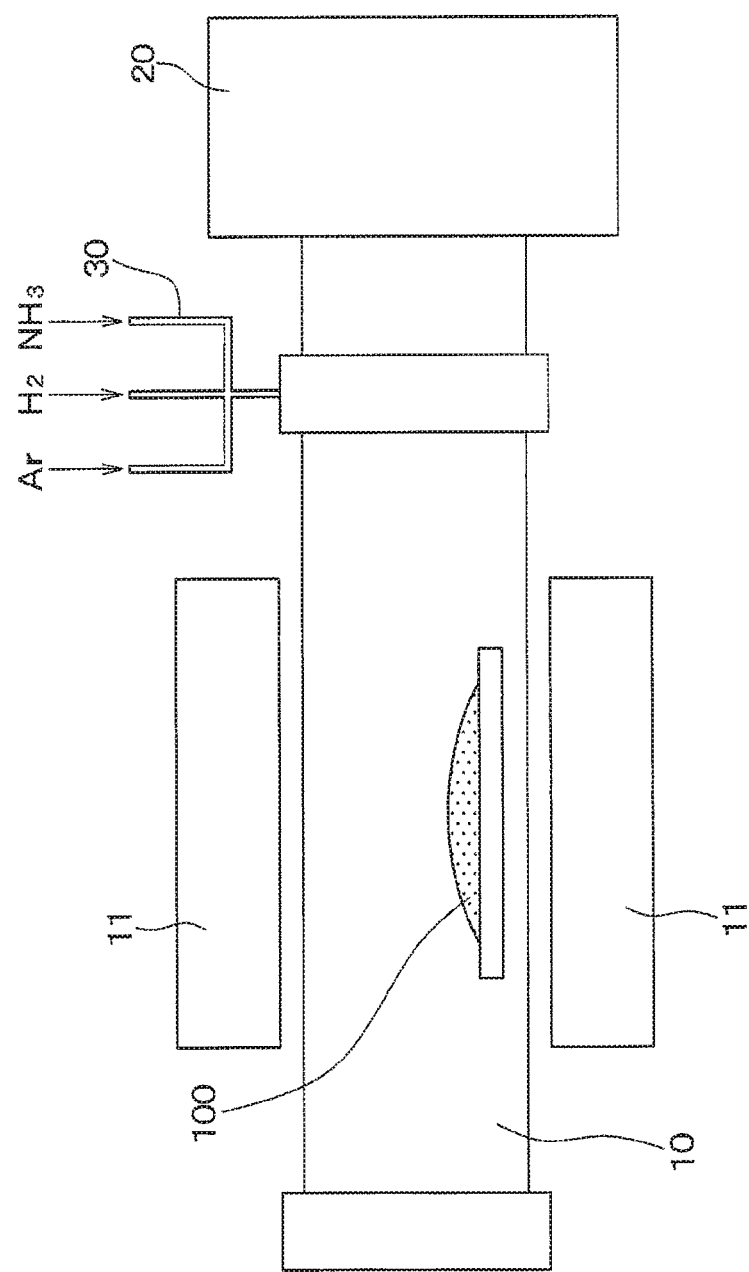
FIG. 5 is a schematic diagram illustrating a structure of a manufacturing apparatus used for manufacturing FeNi ordered alloys of the working examples and the comparative examples according to the first embodiment.

The nitriding treatment and the denitriding treatment are performed for example using the manufacturing apparatus shown in FIG. 5. The manufacturing apparatus has a tube furnace 10 as a heating furnace heated by a heater 11 and a glove box 20 for providing a sample in the tube furnace 10.

As shown in FIG. 5, the manufacturing apparatus also has a gas-introducing part 30 which switches Ar (argon) as a purge gas, $NH_3$ (ammonia) for the nitriding treatment and $H_2$ (hydrogen) for the denitriding treatment and introduces the gasses to the tube furnace 10.

The manufacturing method of the present embodiment using such a manufacturing apparatus is as follows. First, a powder sample of an FeNi random alloy 100 is placed in advance in the tube furnace 10. In the nitriding treatment, $NH_3$ gas is introduced to the tube furnace 10 to make the inside of the tube furnace 10 an $NH_3$ atmosphere, and the FeNi random alloy is heated at a predetermined temperature for a predetermined period and nitrided.

Then, in the denitriding treatment, $H_2$ gas is introduced to the heating furnace to make the inside of the tube furnace 10 an $H_2$ atmosphere, and the nitrided FeNi random alloy is heated at a predetermined temperature for a predetermined period to remove nitrogen. In this manner, an $L1_0$-FeNi ordered alloy having the mean order degree S of 0.4 or more throughout the material and the coercivity He of 87.5 kA/m or more is obtained.

In the working examples and the comparative examples shown in FIG. 4, the powder samples of the FeNi random alloys manufactured by a thermal plasma process were custom-made products manufactured by Nisshin Engineering Inc. and had a composition ratio Fe:Ni of 50:50 and a volume mean particle size of 30 nm to 140 nm.

The powder sample of the FeNi random alloy manufactured by a flame spraying process was product number 677426-5G manufactured by Sigma-Aldrich Japan and had a composition ratio Fe:Ni of 55:45 and a volume mean particle size of 50 nm.

The powder sample of the FeNi random alloy manufactured by a coprecipitation process was obtained by subjecting FeNi oxide to hydrogen reduction and had a composition ratio Fe:Ni of 47:53 and a volume mean particle size of 200 nm.

As shown in FIG. 4, in comparative example S0, an FeNi random alloy which was manufactured by a thermal plasma process and which had a volume mean particle size of 104 nm and a composition ratio Fe:Ni of 50:50 was evaluated by X-ray diffraction without performing the nitriding treatment and the denitriding treatment.

In comparative example S1, using the same FeNi random alloy as that of comparative example S0, the nitriding treatment was performed at 300 degrees Celsius for four hours, and the sample was evaluated by X-ray diffraction without performing the denitriding treatment. In comparative example S2, using the same FeNi random alloy as that of comparative example S0, the denitriding treatment was performed at 300 degrees Celsius for four hours without performing the nitriding treatment, and the sample was evaluated by X-ray diffraction.

In comparative example S3, using the same FeNi random alloy as that of comparative example S0, the nitriding treatment was performed at 300 degrees Celsius for four hours, and the denitriding treatment was performed at 300 degrees Celsius for four hours. The sample was then evaluated by X-ray diffraction. In comparative example S4, using the FeNi random alloy manufactured by a flame spraying process, the nitriding treatment and the denitriding treatment were performed in the same manners as those of comparative example S3, and the sample was evaluated by X-ray diffraction. In comparative example S5, using the FeNi random alloy manufactured by a coprecipitation process, the nitriding treatment and the denitriding treatment were performed in the same manners as those of comparative example S3, and the sample was evaluated by X-ray diffraction.

In comparative examples S6, S7, S8 and S9, the same procedures as those of comparative example S3 were performed except that the treatment temperature of the nitriding treatment was changed to 325 degrees Celsius, 350 degrees Celsius, 400 degrees Celsius or 500 degrees Celsius. In comparative examples S10, S11, S12, S13, S14, S15 and S16, the same procedures as those of comparative example S3 were performed except that the treatment temperature of the denitriding treatment was changed to 150 degrees Celsius, 200 degrees Celsius, 250 degrees Celsius, 350 degrees Celsius, 400 degrees Celsius, 450 degrees Celsius and 500 degrees Celsius. In comparative examples S17 and working examples S18, S19, S20, S21, S22, S23 and S24, samples having a volume mean particle size of 30 nm to 140 nm were used. The nitriding treatment was performed at a temperature of 300 degrees Celsius for a long period of 50 hours, and the denitriding treatment was performed at 300 degrees Celsius for an hour. The other conditions were the same as those of comparative example S3.

Figure 6:
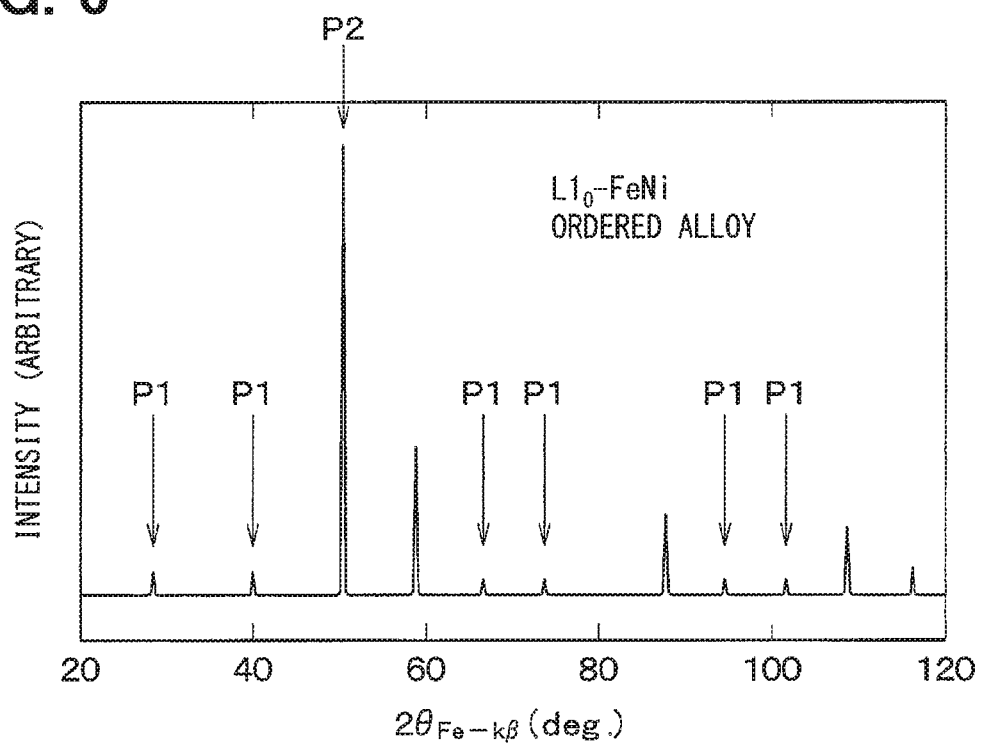
FIG. 6 is a diagram illustrating simulation results of X-ray diffraction pattern of an $L1_0$-FeNi ordered alloy having an order degree S of one.

It is possible to make an X-ray diffraction-based evaluation of whether or not an $L1_0$ ordered structure is formed, by comparing with the X-ray diffraction pattern of the ideal FeNi ordered alloy having the order degree S of one shown in FIG. 6. When an $L1_0$-FeNi ordered alloy is analyzed, peaks called superlattice diffraction peaks P1 are observed at the positions indicated by the arrows in addition to the fundamental diffraction peak P2 as shown in FIG. 6.

Figure 7:
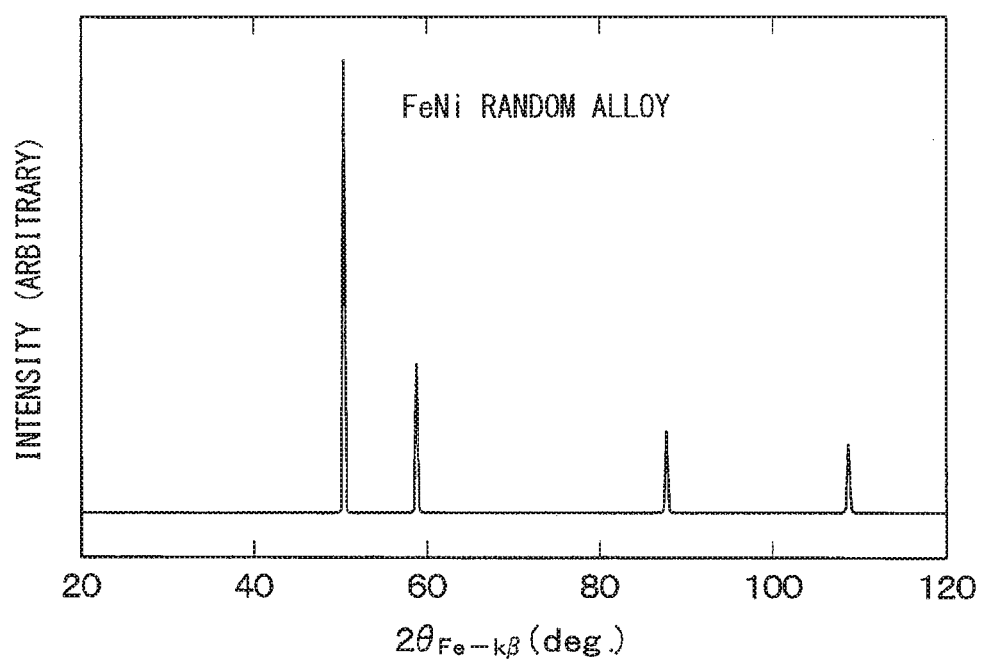
FIG. 7 is a diagram illustrating simulation results of X-ray diffraction pattern of an FeNi random alloy.

When an FeNi random alloy is analyzed, however, although the fundamental diffraction peak P2 is observed, the superlattice diffraction peaks P1 are not observed as shown in FIG. 7. Here, in FIG. 6 and FIG. 7, the X-ray has been assumed to be kβ ray of Fe (wavelength: 1.75653 Å).

From the above points, it was determined for the working examples and the comparative examples that an $L1_0$ ordered structure was formed when the superlattice diffraction peaks P1 were observed in the pattern measured by X-ray diffraction measurement and that an $L1_0$ ordered structure was not formed when the superlattice diffraction peaks P1 were not observed. The determination was performed by observing whether the peaks at 28° and 40°, which are especially easy to observe among the superlattice diffraction peaks P1, were clearly seen or not.

In FIG. 4, the sample is indicated with "YES" when an $L1_0$ ordered structure was formed, and the sample is indicated with "NO" when an $L1_0$ ordered structure was not formed. As shown in FIG. 4, the samples indicated with "YES" are the comparative examples S3 to S9, S11 to S14 and S17 and the working examples S18 to S24, and the samples indicated with "NOT FORMED" are the comparative examples S0 to S2, S10, S15 and S16.

Moreover, the order degrees S of the samples in which an $L1_0$ ordered structure was formed among the working examples and the comparative examples were estimated based on the method described in Non-Patent Literature 1. This estimation of order degrees S can be done with the below order degree S estimation equation for an $L1_0$-FeNi ordered alloy.

$$S = \sqrt{\frac{(I_{sup}/I_{fund})^{obs}}{(I_{sup}/I_{fund})^{cal}}} \qquad \text{(Mathematical expression 1)}$$

In the mathematical expression 1, $I_{sup}$ is an integrated intensity of the superlattice diffraction peaks P1. $I_{fund}$ is an integrated intensity of the fundamental diffraction peak P2. $(I_{sup}/I_{fund})^{obs}$ a ratio of the integrated intensity of the superlattice diffraction peaks P1 and the integrated intensity of the fundamental diffraction peak P2 in the X-ray diffraction pattern measured in each of the working examples and the comparative examples. $(I_{sup}/I_{fund})^{cal}$ is a ratio of the integrated intensity of the superlattice diffraction peaks P1 and the integrated intensity of the fundamental diffraction peak P2 in the X-ray diffraction pattern of FIG. 6, wherein FIG. 6 is a diagram illustrating simulation results of X-ray diffraction pattern of an $L1_0$-FeNi ordered alloy having an order degree S of one. As shown by the mathematical expression 1, the square root of the ratios is determined as the order degree S.

Some typical examples of the X-ray diffraction patterns measured in the working examples and the comparative examples are shown in FIG. 8, FIG. 9, FIG. 10 and FIG. 11. Based on these X-ray diffraction patterns, explanation will be given on whether $L1_0$-FeNi ordered alloys were been obtained or not and explanation will be given on the relationships with the order degree S and the coercivity Hc.

Figure 8:
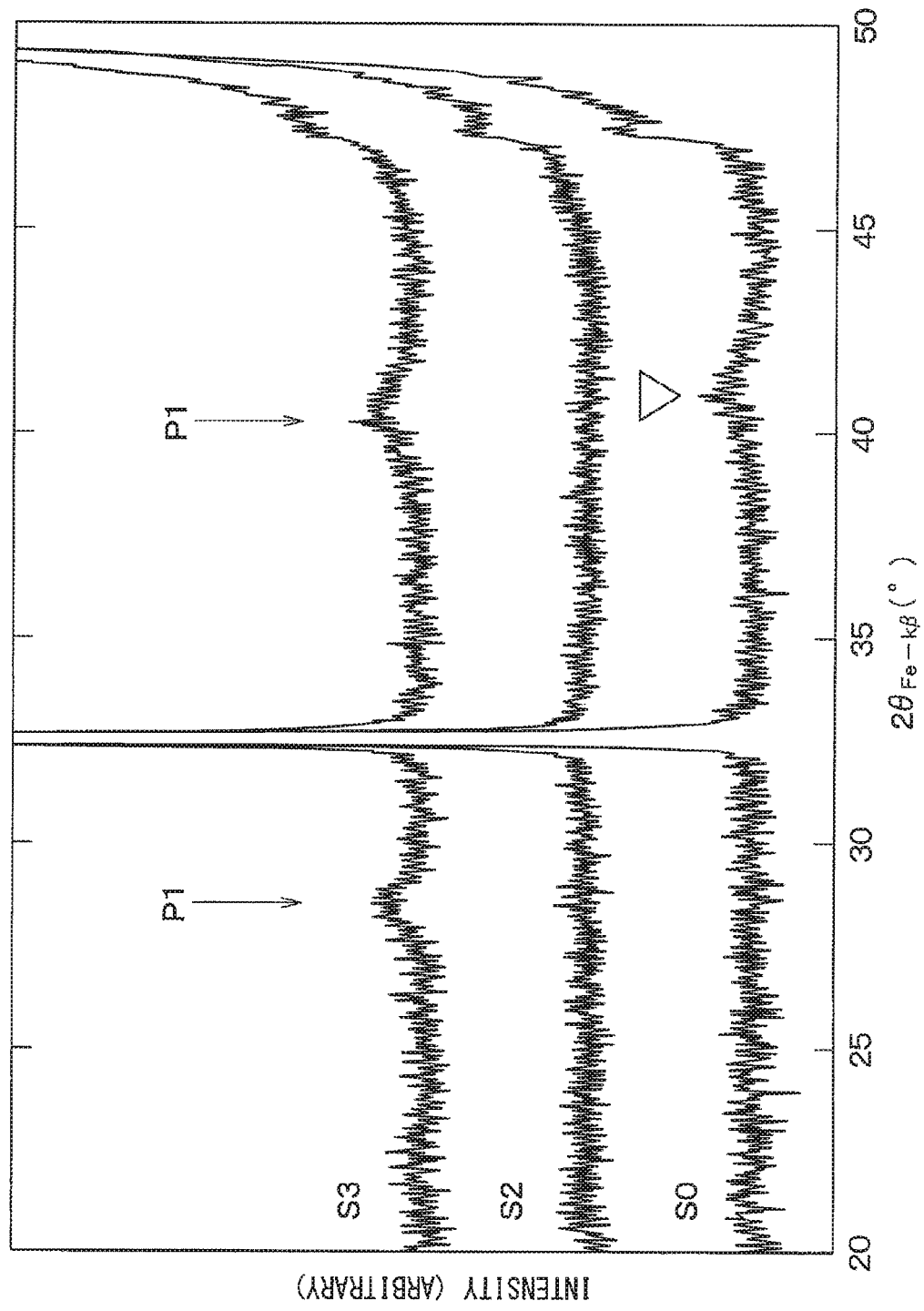
FIG. 8 is a diagram illustrating measurement results of X-ray diffraction patterns of FeNi ordered alloys of comparative examples S0, S2 and S3.

As shown in FIG. 8, in the comparative example S3 in which the nitriding treatment and the denitriding treatment were both performed, the superlattice diffraction peaks P1 at 280 and 400 were clearly observed. On the other hand, the superlattice diffraction peaks P1 were not observed in the comparative example S0 in which the nitriding treatment and the denitriding treatment were not performed and in the comparative example S2 in which only the denitriding treatment was performed without performing the nitriding treatment. It is noted n FIG. 8 that the peak of comparative example S0 indicated with the inverted triangle was due to FeNi oxide and was not the superlattice diffraction peak P1. These results show that, by performing both of the nitriding treatment and the denitriding treatment, an $L1_0$-FeNi ordered alloy was obtained.

Moreover, as shown in FIG. 4, the comparative examples S0 and S2 had the order degrees S of zero due to no formation of FeNi ordered alloy and had the small coercivities Hc, namely 10.2 kA/m and 4.0 kA/m, respectively. Although the comparative example S3 had a relatively large order degree S, namely 0.52, and had the coercivity Hc of 33.3 kA/m which is not a large value.

Figure 9:
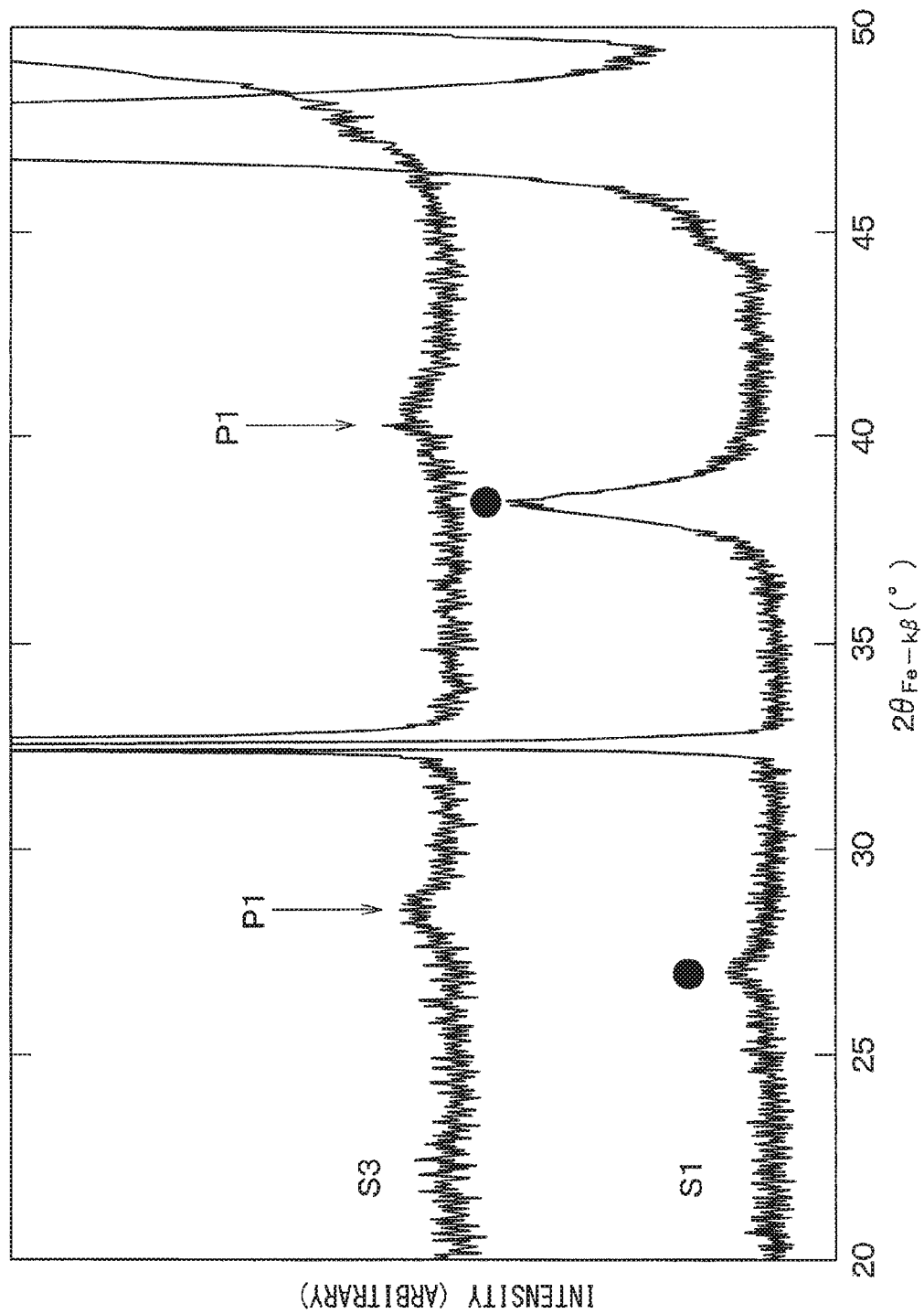
FIG. 9 is a diagram illustrating measurement results of X-ray diffraction patterns of FeNi ordered alloys of comparative examples S1 and S3.

As shown in FIG. 9, the superlattice diffraction peaks P1 at 280 and 400 were clearly observed in the comparative example S3 in which the nitriding treatment and the denitriding treatment were both performed, while the superlattice diffraction peaks P1 were not observed in the comparative example S, in which only the nitriding treatment has been performed without performing the denitriding treatment. In FIG. 9, peaks indicated with black circles were observed in the comparative example S1 at the positions different from those of the superlattice diffraction peaks P1, and the peaks were due to nitrided FeNi and were not the superlattice diffraction peaks P1. In the comparative example S1, the nitriding treatment was performed while the denitriding treatment was not been performed, and a nitride of FeNi was obtained. As shown in FIG. 4, the comparative example S1 had the order degree of zero due to no formation of FeNi ordered alloy and had a small coercivity Hc, namely 4.0 kA/m.

Figure 10:
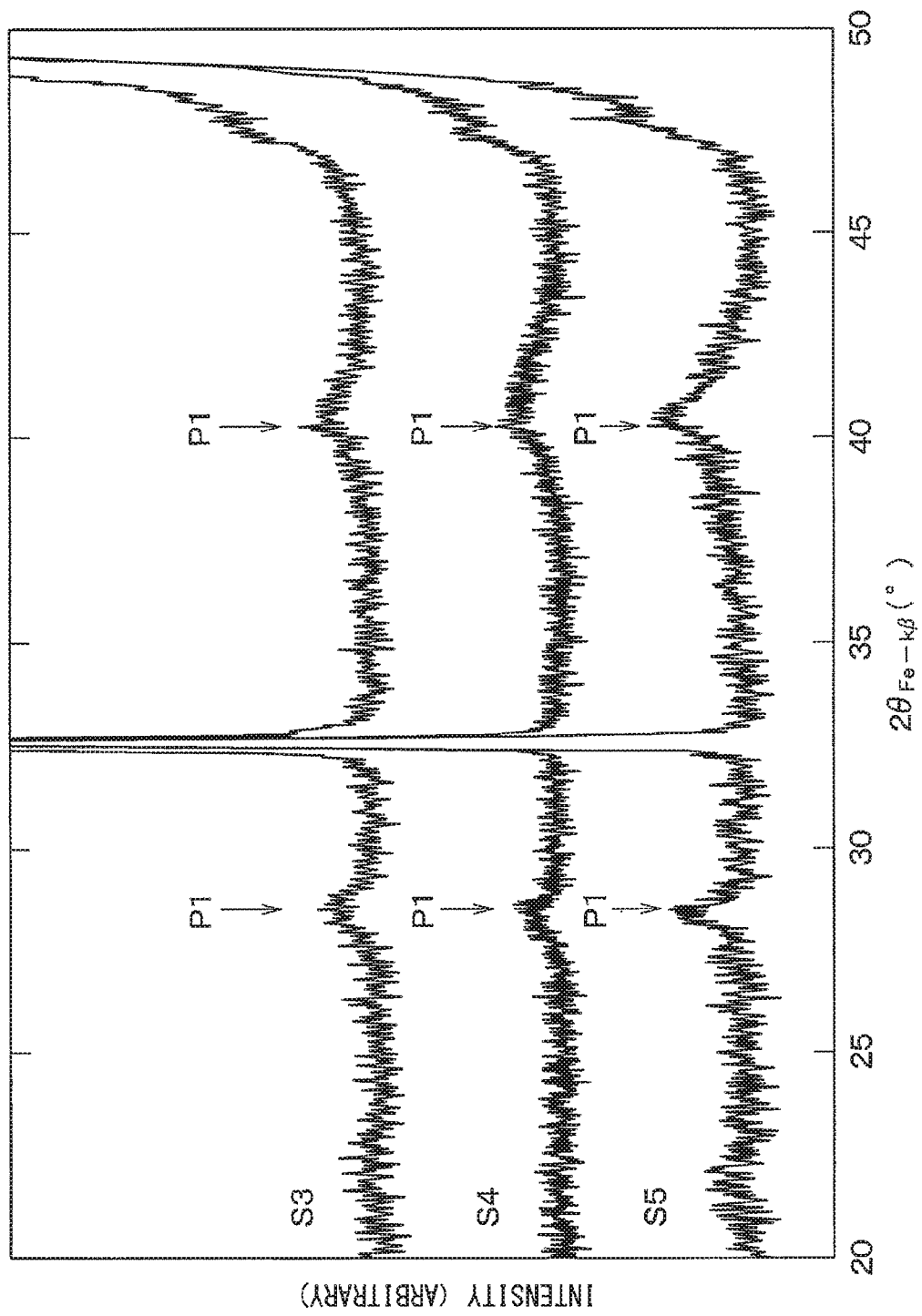
FIG. 10 is a diagram illustrating measurement results of X-ray diffraction patterns of FeNi ordered alloys of comparative examples S3, S4 and S5.

As shown in FIG. 10, although the method for manufacturing the powder sample of the FeNi random alloy and the volume mean particle size were different among comparative examples S3, S4 and S5, the superlattice diffraction peaks P1 at 280 and 400 were clearly observed in all the cases. The difference in the volume mean particle size is easily examinable by observing with an electron microscope. In this manner, it is possible to manufacture an $L1_0$-FeNi ordered alloy by performing the nitriding treatment and the denitriding treatment even when samples which are manufactured by different manufacturing methods and which have different particle sizes are used. As shown in FIG. 4, however, although the order degree S of the comparative example S4 was a relatively large value, namely 0.41, the coercivity Hc was a small value, namely 29.9 kA/m. Moreover, the order degree S of the comparative example S5 was a small value, namely 0.37, and the coercivity Hc was also a small value, namely 27.6 kA/m.

Figure 11:
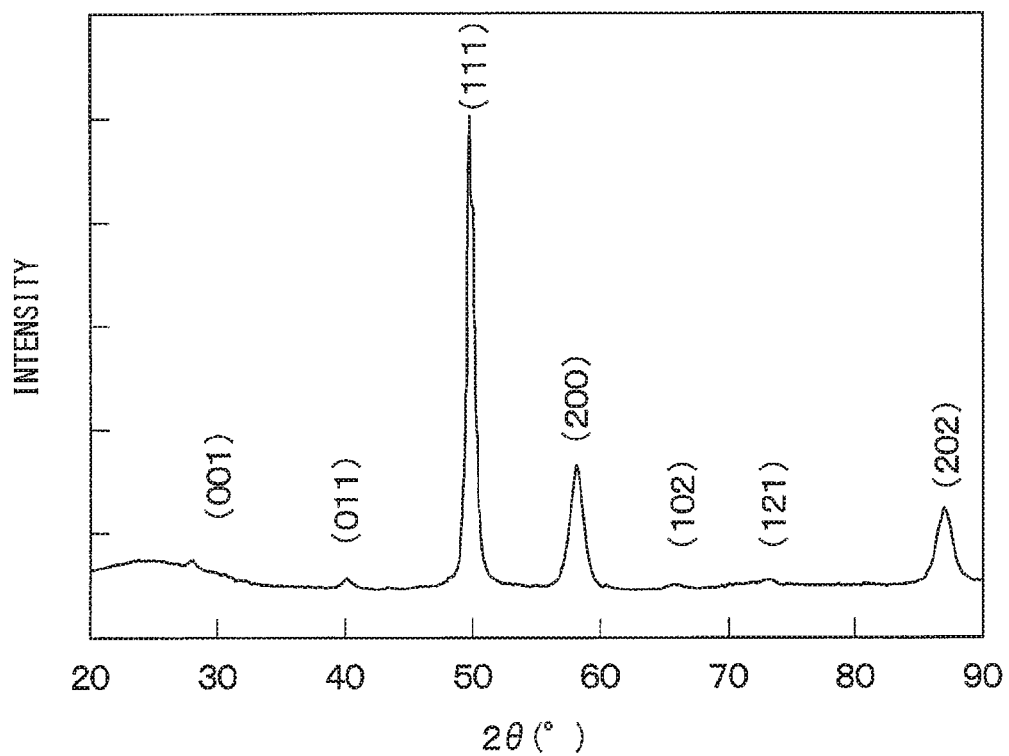
FIG. 11 is a diagram illustrating measurement results of X-ray diffraction pattern of FeNi ordered alloy of working example S21.

The method for manufacturing the powder sample of the FeNi random alloy of the working example S21 was almost the same as that of the comparative example S3, but the periods of the nitriding treatment and the denitriding treatment were 50 hours and an hour, respectively. As shown in FIG. 11, the superlattice diffraction peaks P1 at 280 and 400 were clearly observed in the working example S21. Moreover, the volume mean particle size was relatively large, namely 140 nm. As shown in FIG. 4, the order degree S of the working example S21 had a large value, namely 0.64, and the coercivity Hc had also a large value, namely 150.6 kA/m.

When at least one of the nitriding treatment and the denitriding treatment was not performed as in comparative examples S0 to S2, an $L1_0$-FeNi ordered alloy could not be manufactured. Moreover, the order degrees S ware small, and the coercivities were also small values.

On the other hand, it is possible to manufacture an $L1_0$-FeNi ordered alloy by performing the nitriding treatment and the denitriding treatment, as shown in the comparative examples S3 to S17. However, when the period of the nitriding treatment was short, a sufficient coercivity Hc value could not be obtained although the order degree S at a certain level could be obtained. Moreover, when the temperature of the denitriding treatment was too low as in the comparative example S10 or when the temperature of the denitriding treatment was too high as in the comparative examples S15 and S16, an $L1_0$-FeNi ordered alloy could not be manufactured. In these cases, the order degrees S were zero, and the coercivities Hc were small values.

Now, regarding the above FeNi ordered alloys, the relationships of parameters with the order degree S and the coercivity Hc will be described.

First, the relationship of the order degree S or the coercivity Hc with the conditions for the denitriding treatment or the conditions for the nitriding treatment, the relationship between the coercivity Hc and the volume mean particle size and the relationship between the order degree S and the coercivity Hc will be described.

Figure 12:
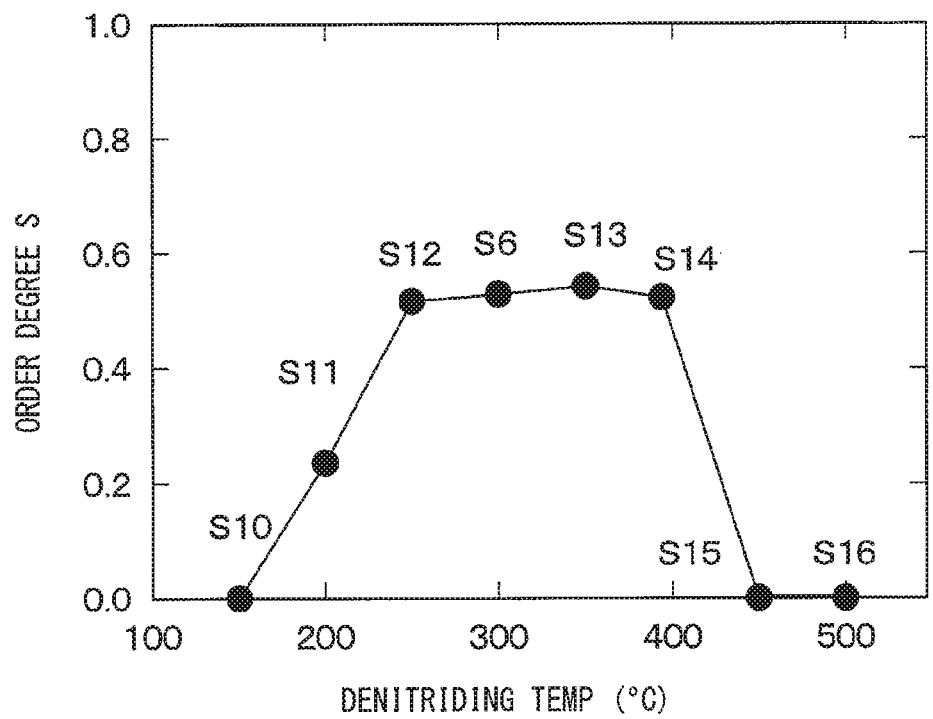
FIG. 12 is a graph illustrating a relationship between order degree S and treatment temperature of denitriding treatment with respect to the FeNi ordered alloys of the working examples and the comparative examples.

FIG. 12 shows the relationship between the order degree S and the treatment temperature of the denitriding treatment regarding the comparative examples S6 and S10 to S16 in which the same nitriding treatments were performed using the same sample but in which the treatment temperatures of the denitriding treatment were different.

It is understood from the results shown in FIG. 12 that the treatment temperature of the denitriding treatment is desirably 250 degrees Celsius or higher and 400 degrees Celsius or lower. As shown in FIG. 12, order degrees S of 0.4 or more were achieved in the comparative examples S12, S6, S13 and S14 in which the treatment temperatures of the denitriding treatment were 250 degrees Celsius or higher and 400 degrees Celsius or lower. In these examples, the order degrees S were larger, namely 0.5 or more. Moreover, although not shown in FIG. 12, the order degrees S were 0.4 or more also in the comparative example S17 and the working examples S18 to S24 in which the treatment temperatures of the denitriding treatment were 250 degrees Celsius or higher and 400 degrees Celsius or lower. However, the order degrees S were less than 0.4 in the comparative examples S10 and S11 in which the treatment temperatures were lower than 250 degrees Celsius, and the superlattices were decomposed because the treatment temperatures were too high in the comparative examples S15 and S16 in which the treatment temperatures were 450 degrees Celsius or higher.

It is understood from the results shown in FIG. 4 that as the period of the denitriding treatment, a short period of an hour or shorter is usable. As shown by the comparative examples S3, S4, S6 to S9, S12 to S14 and S17 and the working examples S18 to S24 in FIG. 4, obtain desired order degrees S was obtained when the treatment was performed for four hours or for an hour. Moreover, as shown by the working examples S18 to S24 in FIG. 4, the coercivities Hc was 87.5 kA/m or more even when the periods of the denitriding treatment was short. On the other hand, as shown by the comparative examples S2 to S17, the coercivities Hc were not always 87.5 kA/m or more regardless of the period of the denitriding treatment. From the results, it has been found that, from viewpoints of the order degree S and the coercivity Hc, it is possible use the short period of the denitriding treatment as long as it is possible to manufacture an FeNi ordered alloy by performing the denitriding treatment.

It is understood from the results shown in FIG. 4 that the treatment temperature of the nitriding treatment is desirably 300 degrees Celsius or higher and 500 degrees Celsius or lower. As shown by the comparative examples S3 to S9 and S11 to S14 in FIG. 4, FeNi ordered alloys were obtained in all the cases when the treatment temperatures of the nitriding treatment were in the range of 300 degrees Celsius or higher and 500 degrees Celsius or lower. Accordingly, in this temperature range, it can be considered that an FeNi ordered alloy can be obtained.

However, the obtained results show that when the treatment period of the nitriding treatment is short, undesirable results are obtained. That is, in the case where the treatment temperature of the nitriding treatment was 325 degrees Celsius as in the comparative examples S12 to S14 in FIG. 4, the coercivities He were less than 87.5 kA/m although the order degrees S were 0.4 or more even when the treatment period was four hours. On the other hand, in the case where the treatment temperature of the nitriding treatment was 300 degrees Celsius as in the working examples S18 to S24, when the treatment period was 50 hours, the order degrees S were 0.4 or more and the coercivities He were large, namely 87.5 kA/m or more, resulting in excellent magnetic properties. In this way, the treatment period of the nitriding treatment is an important element for achieving a large coercivity Hc. As a result of various experiments, the coercivity He were 87.5 kA/m or more when the treatment periods were set at 10 hours or longer. The period slightly varies with the temperature of the nitriding treatment, and the treatment period can be slightly shortened as the treatment temperature becomes higher. A large coercivity He successfully was obtained by setting the treatment period at 10 hours or longer at 300 degrees Celsius, which is the lowest in the appropriate temperature range of the nitriding treatment. Accordingly, at a temperature higher than 300 degrees Celsius, when the treatment period is set to at least 10 hours or longer at a temperature higher than 300 degrees Celsius, it is possible to have the coercivity Hc 87.5 kA/m or more.

In this regard, examples of the treatment temperatures of the nitriding treatment of 300 degrees Celsius, 325 degrees Celsius, 350 degrees Celsius, 400 degrees Celsius and 500 degrees Celsius are shown in the examples shown in FIG. 4, but the treatment temperature of the nitriding treatment is not limited to these examples. The treatment temperature may have a wider temperature width as along the temperature of the nitriding treatment is at least in a range of 300 degrees Celsius or higher and 500 degrees Celsius or lower in the cases of the manufacturing method of the present embodiment.

Furthermore, it was found that the coercivity He is also influenced by the volume mean particle size. Specifically, the coercivity He is larger as the volume mean particle size becomes larger. As shown in FIG. 4, the coercivity He was larger as the volume mean particle size became larger in the cases of the comparative example S17 and the working examples S18 to S24. When the volume mean particle size was 30 nm as in the comparative example S17, the coercivity He was a relatively large value, namely 58.1 kA/m, but this value was not large enough to use a magnet material or a magnetic recording material. However, when the volume mean particle sizes was 45 nm, 60 nm, 80 nm, 120 nm, 140 nm, 130 nm and 100 nm as in the working examples S18 to S24, respectively, the coercivities He were all 87.5 kA/m or more.

By adjusting the volume mean particle size at 45 nm or more in this way, it is possible to not only obtain the order degree S of 0.4 or more but also obtain a large coercivity He value of 87.5 kA/m or more. Although the coercivity He is larger as the volume mean particle size becomes larger in general, the coercivity He decreases after the volume mean particle size exceeds a single-domain size. For example, the coercivity He decreases in some cases when the volume mean particle size exceeds 250 nm. Accordingly, it is desirable that the volume mean particle size is not too large. Although the volume mean particle size exceeding 250 nm is usable, the desired coercivity He can be achieved more certainly when the volume mean particle size is 60 nm or more and 250 nm or less for example.

Figure 13:
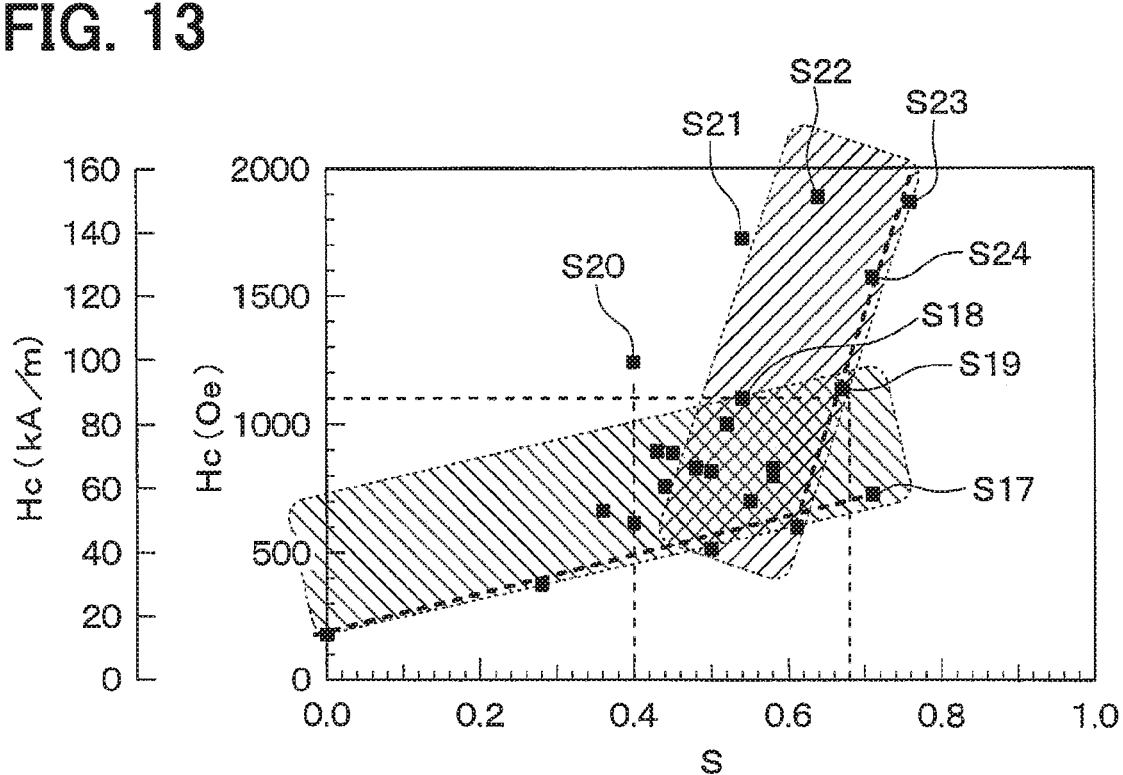
FIG. 13 is a diagram plotting a relationship between order degree S and coercivity Hc with respect to the working examples and the comparative examples shown in FIG. 4.

Furthermore, the order degree S has a close relation with the coercivity Hc. That is, the coercivity He is larger as the order degree S becomes larger. As shown in FIG. 13, when the order degree S is 0.4 or more, it becomes possible to manufacture an alloy having the coercivity He of 87.5 kA/m. When the order degree S is 0.6 or more, it becomes possible to highly likely manufacture an alloy having the coercivity He of 87.5 kA/m or more. Of course, only the large order degree S makes it possible to always obtain the desired coercivity He as shown in FIG. 13, but in general, the coercivity He increases with increasing value of the order degree S. In particular, when the order degree S is 0.7 or more, it becomes possible to obtain the coercivity He of 95.5 kA/m (1200 (Oe)) or more.

As described above, because the FeNi ordered alloy has the order degree S of 0.4 or more and the coercivity He of 87.5 kA/m or more in the present embodiment, the FeNi ordered alloy can be used also as a magnet material or a magnetic recording material. In particular, when the order degree S is 0.7 or more and when the coercivity He is 95.5 kA/m, an excellent magnet material or an excellent magnetic recording material having a larger coercivity He can be obtained. For example, when magnetic powder is obtained from particles of an $L1_0$-FeNi ordered alloy having such a large order degree S and such a large coercivity He and pressed together into a magnet shape, an FeNi ordered alloy magnet can be obtained.

An FeNi ordered alloy magnet generated in this manner can be applied for example to a motor-magnet carried in a vehicle or the like. Moreover, by coating a film in a tape shape with particles of the FeNi ordered alloy for example, a magnetic tape used as a magnetic recording medium can be configured. Because the FeNi ordered alloy obtained in the present embodiment has a large coercivity Hc, rewriting of the stored data by the environmental magnetic field can be limited when the FeNi ordered alloy is used as a magnetic material of a magnetic recording medium.

In order to obtain such an FeNi ordered alloy, after performing the nitriding treatment of nitriding the FeNi random alloy 100, the denitriding treatment of removing nitrogen from the nitrided FeNi random alloy may be performed. In the nitriding treatment, the treatment temperature is 300 degrees Celsius or higher and 500 degrees Celsius or lower, and the treatment period is 10 hours or longer. In the denitriding treatment, the treatment temperature is 250 degrees Celsius or higher and 400 degrees Celsius or lower.

Regarding the composition of Fe, a composition near 50 atomic % is a composition with which an $L1_0$-FeNi ordered alloy is easily obtained. In the present embodiment, a large order degree S of 0.4 or more is achieved with an alloy having a composition in the range of Fe: 55 to 47 atomic % as shown by the working examples and the comparative examples above.

The sample shape of the FeNi random alloy is not specified, but a powder sample is desirable as described above to shorten the nitriding treatment and the denitriding treatment. In particular, because the nitriding treatment requires time, the FeNi random alloy is desirably a nanoparticle sample to perform the treatments rapidly. Moreover, by adjusting the volume mean particle size at 45 nm or more, an FeNi ordered alloy having a larger coercivity He can be obtained.

In the present embodiment, ordering of powders of FeNi random alloys manufactured by different methods was examined as described above. More specifically, the method for manufacturing the random alloy is not limited to the thermal plasma process, the flame spraying process or the coprecipitation process described above. Although it is not shown in FIG. 4, when random alloys manufactured by a method for manufacturing a random alloy other than a thermal plasma process, such as a flame spraying process or a coprecipitation process, are used and when the conditions for the nitriding treatment and the denitriding conditions are the same as the conditions of working examples S18 to S24, results similar to those of the working examples can be obtained.

Moreover, in order to generate an $L1_0$-FeNi ordered alloy, the nitrogen concentration of the nitride generated by the nitriding treatment is desirably around 20 atomic % to 33 atomic % in terms of the atomic weight ratio based on the total amount of Fe, Ni and nitrogen.

According to the present embodiment, by nitriding with ammonia gas and denitriding with hydrogen gas as described above, an $L1_0$-FeNi ordered alloy can be obtained without the contamination with impurities, but this does not limit the nitriding method and the denitriding method.

As represented by the working examples and the comparative examples above, by performing the denitriding treatment of removing nitrogen after subjecting the FeNi random alloy to the nitriding treatment, an $L1_0$-FeNi ordered alloy having a large order degree S of 0.4 or more and a large coercivity He of 87.5 kA/m or more can be obtained. This is a simple method in terms of both the apparatus and the steps as compared with the conventional layering method using molecular beam epitaxy and the conventional thermal treatment method with the application of neutrons described above. Therefore, according to the present embodiment, an $L1_0$-FeNi ordered alloy having a desired order degree S and a desired coercivity He can be easily synthesized.

Second Embodiment

The second embodiment will be described. The present embodiment enables a further increase in the order degree S as compared with that of the first embodiment. Basic manufacturing steps of the present embodiment are the same as those of the first embodiment, and thus, only the points different from the first embodiment will be described.

In the present embodiment, when an $L1_0$-FeNi ordered alloy is generated from an FeNi random alloy, an intermediate product is produced to further increase the order degree S. Although the nitriding treatment and the denitriding treatment are performed in the first embodiment, FeNiN is generated as an intermediate product when the nitriding treatment is finished in the present embodiment. At this point, so that the intermediate product is generated accurately by the nitriding treatment, treatment of removing the oxide film generated on the surface of the FeNi random alloy is performed prior to the nitriding treatment. By performing the denitriding treatment, the $L1_0$-FeNi ordered alloy is generated from FeNiN serving as the intermediate product.

Figure 14:
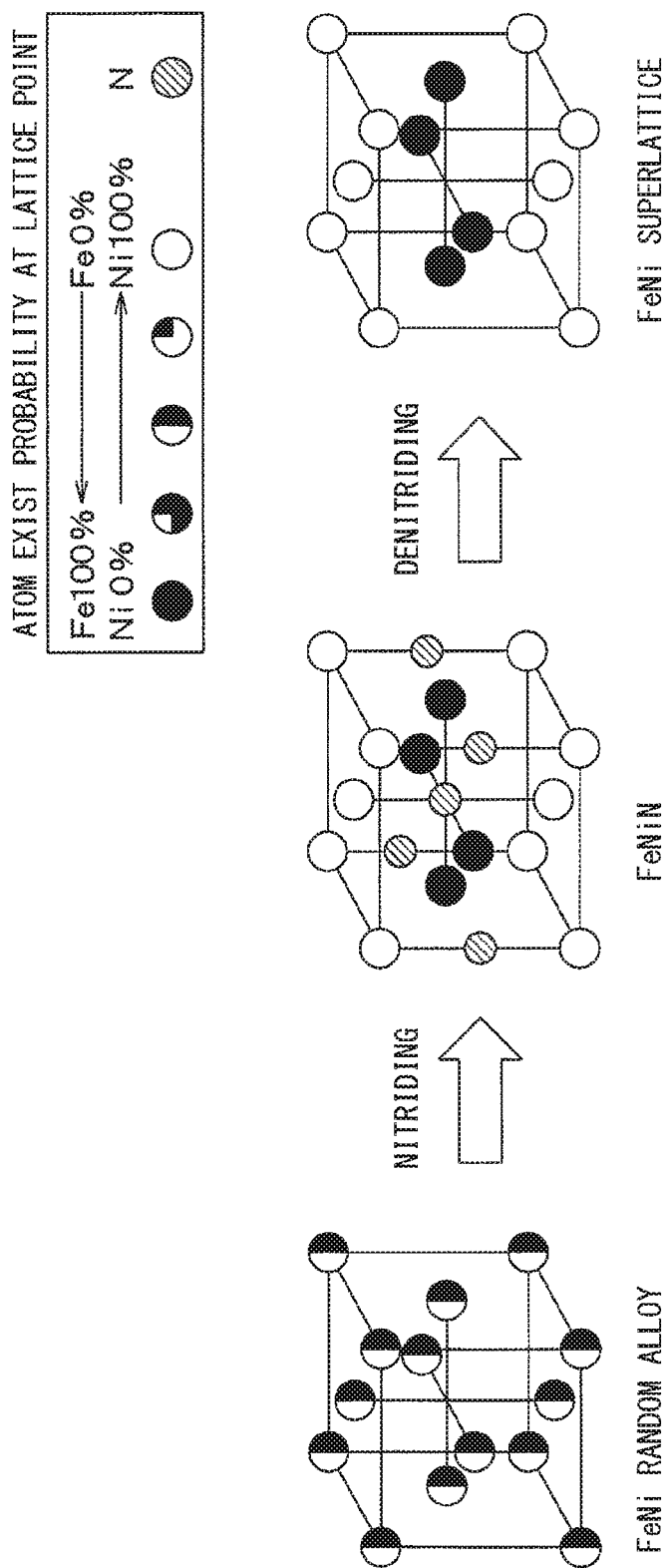
FIG. 14 is a schematic diagram illustrating lattice structures obtained by subjecting an FeNi random alloy to nitriding treatment to generate an intermediate product and then performing denitriding treatment.

Specifically, as shown in FIG. 14, the FeNi random alloy is subjected to the nitriding treatment, and FeNiN serving as an intermediate product which contains many Ni atoms at the site II is generated by incorporating nitrogen into the site II shown in FIG. 1. Then, by performing the denitriding treatment and releasing nitrogen from the site II, the $L1_0$-FeNi ordered alloy is provided.

First, an FeNi random alloy is prepared. Then, because an oxide film is on the surface of the FeNi random alloy, removal treatment of removing the oxide film on the surface of the FeNi random alloy is performed prior to the nitriding treatment. Then, the nitriding treatment is performed following the removal treatment.

As the removal treatment, thermal treatment for example at between 300 degrees Celsius and 450 degrees Celsius is performed in an etching atmosphere of the oxide film. As a result, the oxide film on the surface of the FeNi random alloy is removed, and the surface turns into a state which can be easily nitrided. As the nitriding treatment, thermal treatment for example at between 200 degrees Celsius and 400 degrees Celsius is performed in an atmosphere containing N. As a result, the FeNi random alloy, which can be easily nitrided after the removal of the oxide film, can be accurately nitrided, and FeNiN acting as the intermediate product is generated. In this regard, because the nitriding treatment here is performed after removing the oxide film, the nitriding reaction takes place more easily, and thus the temperature may be lower than that of the first embodiment. The temperature of the nitriding treatment is thus from 200 degrees Celsius to 400 degrees Celsius, but the temperature may exceed 400 degrees Celsius and may be 500 degrees Celsius or lower as in the first embodiment.

Next, FeNiN as the intermediate product is subjected to the denitriding treatment. As the denitriding treatment, thermal treatment for example between 200 and 400 degrees Celsius is performed in a denitriding atmosphere. As a result, nitrogen leaves the intermediate product, and the $L1_0$-FeNi ordered alloy can be generated. By generating FeNiN as the intermediate product and then generating the $L1_0$-FeNi ordered alloy in this manner, a larger order degree S can be obtained.

A specific example will be described in which an $L1_0$-FeNi ordered alloy was actually generated through the removal treatment, the nitriding treatment and the denitriding treatment.

Figure 15A:
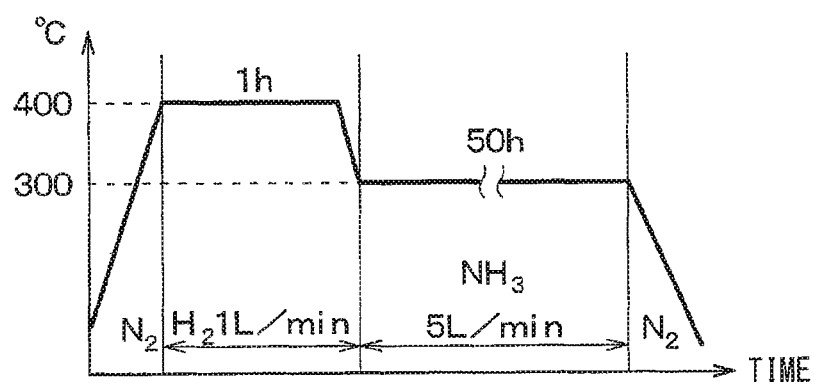
FIG. 15A is a time chart illustrating profiles of removal treatment of an oxide film and nitriding treatment.

First, the removal treatment and the nitriding treatment were performed according to the profiles shown in FIG. 15A.

Specifically, a heating furnace such as the tube furnace 10 or a muffle furnace was prepared, and a nanoparticle sample of an FeNi random alloy having a mean particle size of 30 nm was placed in the heating furnace. Then, the heating furnace was heated from room temperature to the temperature of the removal treatment of removing the oxide film, namely 400 degrees Celsius here. At this point, an inert gas was introduced to limit the oxidation of the nanoparticle sample due to the oxygen in the heating furnace, and the heating step here was performed while $N_2$ (nitrogen) was being introduced.

Although $N_2$, which is usable also in the subsequent nitriding treatment, was used as the inert gas, an inert gas other than $N_2$ such as Ar (argon) and He (helium) is also usable.

After the heating furnace was heated to the temperature of the removal treatment, the introduction of $N_2$ was stopped, and an etching gas of the oxide film was introduced to create an etching atmosphere. Then, the temperature of the heating furnace was kept at a temperature required for removing the oxide film for a predetermined period. In this experiment, $H_2$ (hydrogen) was used as the etching gas, and $H_2$ was introduced into the heating furnace at a rate of 1 L/min. The heating furnace was kept at 400 degrees Celsius for an hour. The oxide film on the surface of the nanoparticle sample was thus removed.

The period required for removing the oxide film is any suitable period, but it was found that it is possible to remove the oxide film to some extent for example in a period of 10 minutes or longer. The temperature for removing the oxide film may be at least between 300 degrees Celsius and 450 degrees Celsius.

The lower limit value of the temperature for removing the oxide film is given as 300 degrees Celsius because it was found that the oxide film is removable at least at 300 degrees Celsius or higher. However, it is considered that the oxide film is removable even at a temperature lower than 300 degrees Celsius when enough time is taken. The upper limit value of the temperature for removing the oxide film is given in order that the subsequent nitriding of the FeNi random alloy is easily performable. That is, when the temperature for removing the oxide film is higher than 450 degrees Celsius, the surface of the FeNi random alloy after the removal of the oxide film is sintered and becomes difficult to nitride. Therefore, the temperature is given as 450 degrees Celsius or lower to limit the sintering of the surface of the FeNi random alloy. The rate for introducing the etching gas into the heating furnace is also any suitable rate, and in the case of $H_2$ for example, the oxide film was removable at least at a rate in the range of 0.3 to 5 L/min.

After finishing the removal treatment of the oxide film, the nitriding treatment was subsequently performed in the same heating furnace. Specifically, by switching over the gas introduced into the heating furnace from the etching gas to nitriding gas, the inside of the heating furnace had an atmosphere containing N, and the temperature was kept at a temperature required for nitriding. In this experiment, $NH_3$ (ammonia) was used as the nitriding gas and introduced into the heating furnace at a rate of 5 L/min, and the heating furnace was kept at 300 degrees Celsius for 50 hours. The nanoparticle sample was thus nitrided, and FeNiN as the intermediate product was generated.

The period required for the nitriding treatment is any suitable period, but it was found that FeNiN as the intermediate product can be synthesized for example in 10 hours. The temperature of the nitriding treatment may be at least between 200 degrees Celsius and 400 degrees Celsius. The rate for introducing the nitriding gas into the heating furnace for creating an atmosphere containing N is also any suitable rate, and in the case of $NH_3$ for example, a nanoparticle sample was nitrided at least at a rate in the range of 0.1 to 10 L/min.

After the removal treatment of the oxide film in this manner, the nitriding treatment was subsequently performed. This makes it possible to suppress the generation of another oxide film on the surface of the FeNi random alloy after removing the oxide film, and this makes it unnecessary to perform another heating step. Thus, it is possible to simplify the thermal treatment and shorten the period.

Figure 15B:
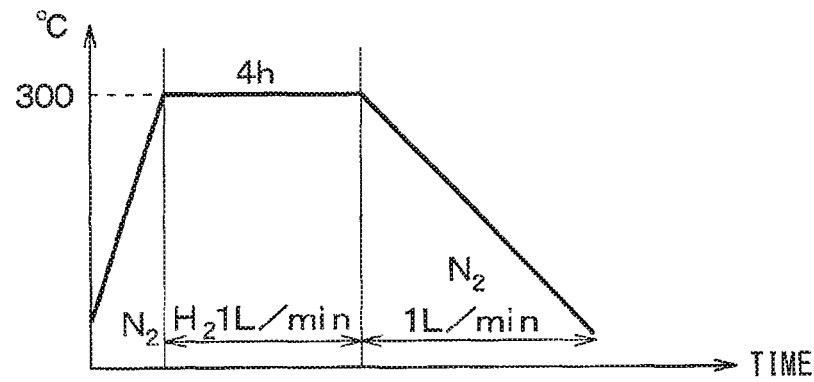
FIG. 15B is a time chart illustrating a profile of denitriding treatment.

Subsequently, the denitriding treatment was performed. The denitriding treatment was performed according to the profile shown in FIG. 15B. In this example, although the denitriding treatment was performed a while after the nitriding treatment, it is possible to perform the treatments successively.

First, a heating furnace such as the tube furnace 10 or a muffle furnace was prepared, and FeNiN as the intermediate product generated according to the profile in FIG. 15A was placed in the heating furnace. Then, the heating furnace was heated from room temperature to the temperature of the denitriding treatment, namely 300 degrees Celsius in this example. Also at this point, an inert gas was introduced in order to limit the oxidation of FeNiN as the intermediate product due to the oxygen in the heating furnace, and the heating step here was performed while $N_2$ was being introduced.

After the heating furnace was heated to the temperature of the denitriding treatment, the introduction of $N_2$ was stopped, and an atmosphere in which the denitriding treatment is performable was created. Then, the temperature of the heating furnace was kept at a temperature required for denitriding for a predetermined period. In this experiment, the atmosphere in which denitriding is performable was created using $H_2$ (hydrogen), and $H_2$ was introduced into the heating furnace at a rate of 1 L/min. The heating furnace was kept at 300 degrees Celsius for four hours. FeNiN as the intermediate product was thus denitrided.

The period required for the denitriding treatment is any suitable period, but it was found that it is possible to generate an $L1_0$-FeNi ordered alloy by performing the denitriding treatment for example for an hour or longer. It was also found that the temperature of the denitriding treatment at least between 200 degrees Celsius and 400 degrees Celsius is preferable. The rate for introducing the gas into the heating furnace for creating an atmosphere in which the denitriding treatment is performable is also any suitable rate, and in the case of $H_2$ for example, the denitriding treatment was successfully performed at least at a rate in the range of 0.1 to 5 L/min.

By performing the denitriding treatment described above, an $L1_0$-FeNi ordered alloy was successfully generated. The mean order degree S of the $L1_0$-FeNi ordered alloy generated in this manner was determined throughout the material. Specifically, the order degree S was determined by the powder X-ray diffraction pattern.

Figure 16:
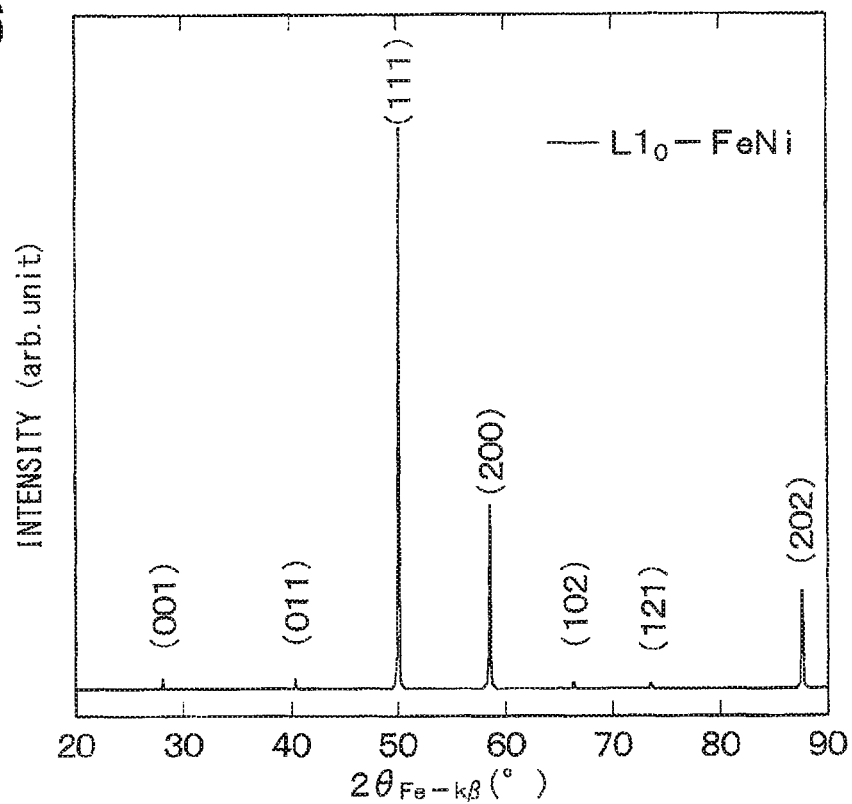
FIG. 16 is a diagram illustrating an X-ray diffraction pattern of $L1_0$-FeNi ordered alloy powder having an order degree S of one.
Figure 17:
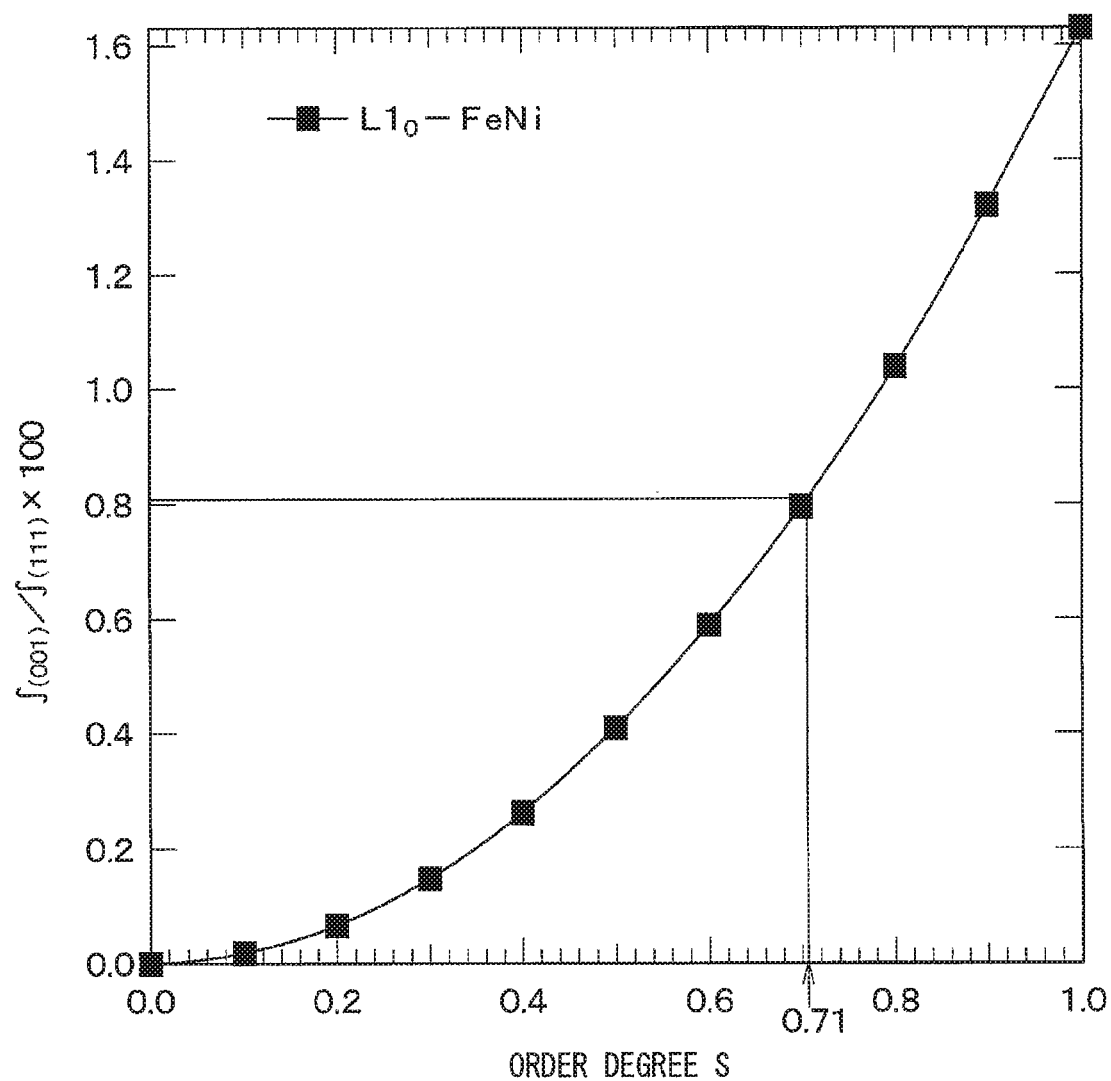
FIG. 17 is a graph illustrating a relationship between order degree S and diffraction intensity ratio.

For example, the X-ray diffraction pattern of powder of an $L1_0$-FeNi ordered alloy in which the order degree S is one is as shown in FIG. 16. In the X-ray diffraction pattern, the order degree S has the relationship shown in FIG. 17 with the diffraction intensity ratio which is the ratio of the integrated intensity of the diffraction peak from the (001) plane as the superlattice reflection, namely the superlattice diffraction peak, and the integrated intensity of the diffraction peak from the (111) plane, namely the fundamental diffraction peak. Accordingly, the X-ray diffraction pattern of the $L1_0$-FeNi ordered alloy generated as in the present embodiment is determinable and the order degree S is obtainable from the results.

Figure 18:
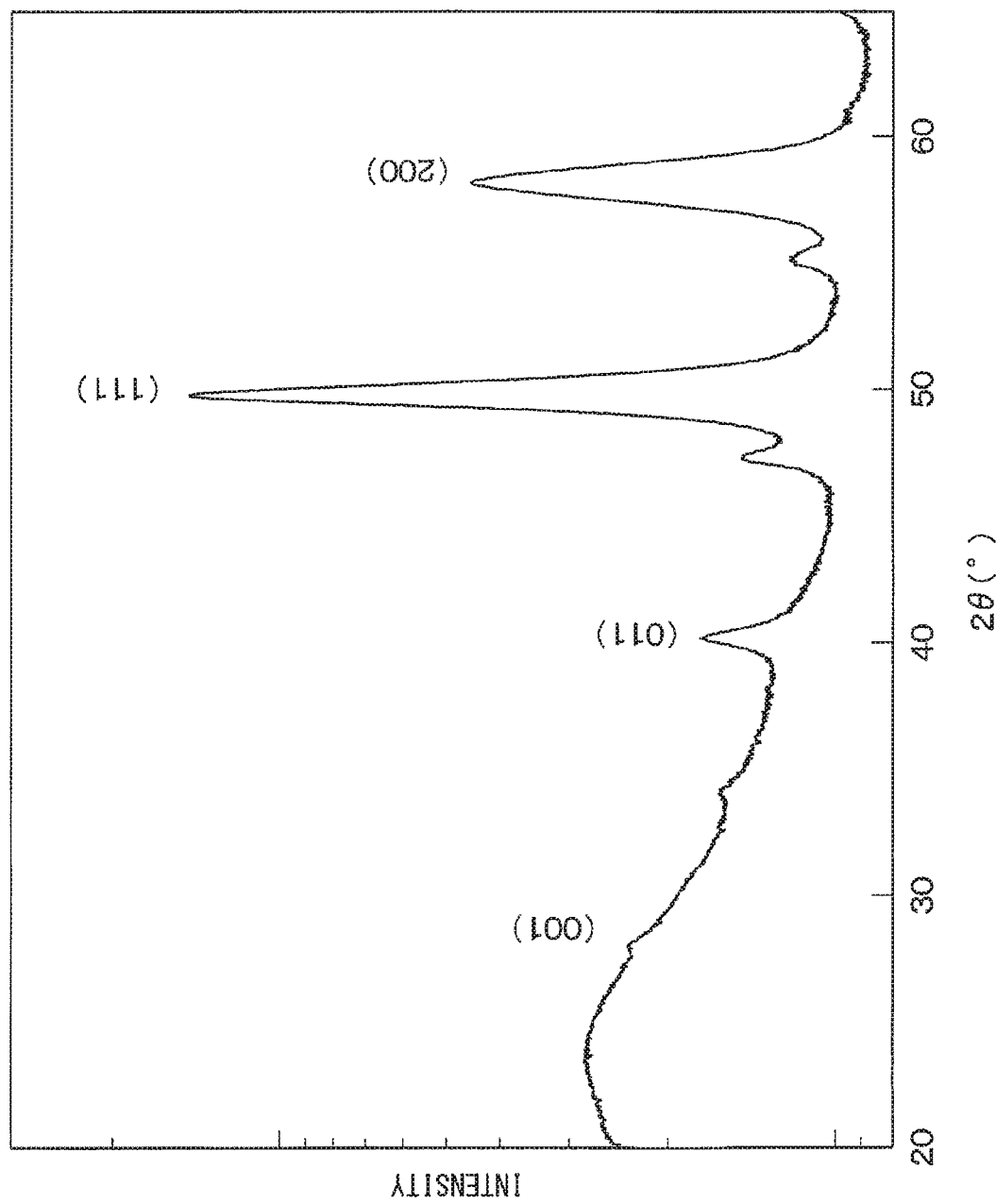
FIG. 18 is a diagram illustrating measurement results of X-ray diffraction pattern of an $L1_0$-FeNi ordered alloy manufactured by a manufacturing method of a second embodiment.

Specifically, as in the present embodiment, FeNiN as the intermediate product was generated by performing the removal treatment of an oxide film of an FeNi random alloy and then performing the nitriding treatment, and an $L1_0$-FeNi ordered alloy was generated by further performing the denitriding treatment. Then, the X-ray diffraction pattern was determined. FIG. 18 shows the results.

As shown in FIG. 18, because the peak of the superlattice diffraction was observed from the (001) plane, it is shown that an FeNi superlattice was formed. The diffraction intensity ratio was calculated based on the results, and the diffraction intensity ratio was 0.8. The order degree S at the diffraction intensity ratio of 0.8 was determined from FIG. 17, and the order degree S has been a large value, namely 0.71.

In this manner, a large order degree S was successfully obtained regarding the $L1_0$-FeNi ordered alloy generated by the manufacturing method of the present embodiment. Furthermore, the magnetic properties of the $L1_0$-FeNi ordered alloy was evaluated, and an anisotropy magnetic field of a relatively high value, namely 1120 kA/m, was successfully obtained.

As explained above, in the present embodiment, an FeNi random alloy is subjected to the nitriding treatment to generate FeNiN as the intermediate product, and an $L1_0$-

FeNi ordered alloy is generated by further performing the denitriding treatment. By such a manufacturing method, it is possible to easily manufacture an $L1_0$-FeNi ordered alloy having a large mean order degree S of 0.7 or more throughout the material. By achieving such a large order degree S, it is possible to provide the FeNi ordered alloy with the coercivity He of a large value. Accordingly, it is possible to easily obtain an FeNi ordered alloy having the coercivity He of 87.5 kA/m or more.

In particular, by performing the nitriding treatment after performing the removal treatment of removing the oxide film on the surface of the FeNi random alloy, it is possible to generate the intermediate product more accurately. Accordingly, by performing the removal treatment, it is possible to obtain an $L1_0$-FeNi ordered alloy having a larger order degree S.

It has shown that the present embodiment differs from the first embodiment in that: the oxide film is removed; the intermediate product is obtained by the nitriding treatment; and it is possible to lower the treatment temperature of the nitriding treatment. The other points, such as the period of the denitriding treatment and the volume mean particle size, are the same as those of the first embodiment.

While the present disclosure has been described with reference to embodiments described above, the present disclosure covers various modification and equivalent arrangements. In addition, while the various combinations and configurations, other combinations and configurations, including more, less or only a single element, are also within the spirit and scope of the present disclosure.

For example, although the conditions for the nitriding treatment and the denitriding treatment are illustrated in the first embodiment, the illustrated conditions are merely examples. That is, as long as an $L1_0$-FeNi ordered alloy having the order degree S of 0.4 or more and the coercivity He of 87.5 kA/m or more can be obtained by the nitriding treatment and the denitriding treatment, the treatment temperatures and the treatment periods of the treatments are not limited to the examples. Similarly, although the conditions for the removal treatment of the oxide film, the nitriding treatment and the denitriding treatment are illustrated in the second embodiment, the conditions are merely examples. That is, as long as an $L1_0$-FeNi ordered alloy having the order degree S of 0.4 or more and the coercivity He of 87.5 kA/m or more can be obtained, the treatment temperatures and the treatment periods of the treatments are not limited to the examples.

Moreover, although the nitriding treatment and the denitriding treatment are preformed to obtain the $L1_0$-FeNi ordered alloy in the first and second embodiments, a method other than the nitriding treatment and the denitriding treatment may be performed to obtain an $L1_0$-FeNi ordered alloy. Specifically, an $L1_0$-FeNi ordered alloy may be obtained by performing treatment for synthesizing a compound in which Fe and Ni are arranged in the same lattice structure as $L1_0$-FeNi ordered structure and then performing treatment for removing an unnecessary element other than Fe and Ni from the compound.

Although the $L1_0$-FeNi ordered alloy according to the above embodiments is applied to a magnetic material such as a magnet material and a magnetic recording material, the application range of the FeNi ordered alloy is not limited to these magnetic materials.

What is claimed is:

1. An FeNi ordered alloy having
an $L1_0$ ordered structure,
a determined mean order degree S of 0.4 or more throughout the FeNi ordered alloy, the determined mean order degree being an estimation of a mean order degree throughout the FeNi ordered alloy estimated by X-ray diffraction measurement, and
a coercivity of 87.5 kA/m or more,
wherein the determined mean order degree S throughout the FeNi ordered alloy is expressed as $$S = \sqrt{\frac{(I_{sup}/I_{fund})^{obs}}{(I_{sup}/I_{fund})^{cal}}}$$

where
$I_{sup}$ in $(I_{sup}/I_{fund})^{obs}$ is an integrated intensity of a superlattice diffraction peak in an X-ray diffraction pattern obtained by the X-ray diffraction measurement,
$I_{fund}$ in $(I_{sup}/I_{fund})^{obs}$ is an integrated intensity of a fundamental diffraction peak in the X-ray diffraction pattern obtained by the X-ray diffraction measurement,
$I_{sup}$ in $(I_{sup}/I_{fund})^{cal}$ is an integrated intensity of a superlattice diffraction peak in a simulation result of an X-ray diffraction pattern of an $L1_0$-FeNi ordered alloy having the mean order degree of 1 throughout the $L1_0$-FeNi ordered alloy, and
$I_{fund}$ in $(I_{sup}/I_{fund})^{cal}$ is an integrated intensity of a fundamental diffraction peak in the simulation result of the X-ray diffraction pattern of the $L1_0$-FeNi ordered alloy having the mean order degree of 1 throughout the $L1_0$-FeNi ordered alloy;
wherein the $L1_0$ ordered structure has the superlattice diffraction peak from a (001) plane; and
wherein the superlattice diffraction peak is based on a 28 degree peak in the X-ray diffraction measurement with a kβ X-ray of Fe.

2. The FeNi ordered alloy according to claim 1, further having
a volume mean particle size of 45 nm or more.

3. The FeNi ordered alloy according to claim 1,
wherein the determined mean order degree S is 0.7 or more, and
wherein the coercivity is 97.5 kA/m or more.

4. An FeNi ordered alloy magnet comprising
the FeNi ordered alloy according to claim 1.

5. A method for manufacturing the FeNi ordered alloy according to claim 1, comprising
performing nitriding treatment of nitriding an FeNi random alloy (100), and
performing denitriding treatment of removing nitrogen from the nitrided FeNi random alloy to obtain an $L1_0$-FeNi ordered alloy having a mean order degree of the material as a whole of 0.4 or more and a coercivity of 87.5 kA/m or more,
wherein, in the nitriding treatment, a treatment temperature of the nitriding treatment is greater than or equal to 300 degrees Celsius and is less than or equal to 500 degrees Celsius, and a treatment period is 10 hours or longer.

6. A method for manufacturing the FeNi ordered alloy according to claim 1, comprising
synthesizing a compound in which Fe and Ni are arranged in the same lattice structure as $L1_0$-FeNi ordered structure, and generating an $L1_0$-FeNi ordered alloy by removing an unnecessary element other than Fe and Ni from the compound, wherein synthesizing the compound includes synthesizing FeNiN as an intermediate product of the compound by nitriding an FeNi random alloy at a treatment temperature greater than or equal to 200 degrees Celsius and less than or equal to 500 degrees Celsius for a treatment period of 10 hours or longer.

7. The method for manufacturing an FeNi ordered alloy according to claim 6, further comprising removing an oxide film from the FeNi random alloy, wherein the synthesizing of the compound is performed after removing the oxide film, and wherein the FeNiN as the intermediate product is synthesized by nitriding the FeNi random alloy after removing the oxide film.

* * * * *